(12) United States Patent
Wong et al.

(10) Patent No.: US 11,357,024 B2
(45) Date of Patent: Jun. 7, 2022

(54) INFRASTRUCTURE EQUIPMENT, TERMINAL DEVICE AND METHODS

(71) Applicant: Convida Wireless, LLC, Wilmington, DE (US)

(72) Inventors: Shin Horng Wong, Basingstoke (GB); Samuel Asangbeng Atungsiri, Basingstoke (GB)

(73) Assignee: Convida Wireless, LLC, Wilmington, DE (US)

( * ) Notice: Subject to any disclaimer, the term of this patent is extended or adjusted under 35 U.S.C. 154(b) by 132 days.

(21) Appl. No.: 16/622,976

(22) PCT Filed: Jun. 5, 2018

(86) PCT No.: PCT/EP2018/064763
§ 371 (c)(1),
(2) Date: Dec. 16, 2019

(87) PCT Pub. No.: WO2018/228865
PCT Pub. Date: Dec. 20, 2018

(65) Prior Publication Data
US 2020/0128570 A1    Apr. 23, 2020

(30) Foreign Application Priority Data

Jun. 16, 2017 (EP) ..................................... 17176495
Oct. 12, 2017 (EP) ..................................... 17196256

(51) Int. Cl.
*H04W 4/00* (2018.01)
*H04W 72/12* (2009.01)
*H04W 72/04* (2009.01)

(52) U.S. Cl.
CPC ... *H04W 72/1247* (2013.01); *H04W 72/0446* (2013.01); *H04W 72/0453* (2013.01); *H04W 72/1273* (2013.01)

(58) Field of Classification Search
CPC ......... H04W 72/1247; H04W 72/0446; H04W 72/0453; H04W 72/1273
(Continued)

(56) References Cited

U.S. PATENT DOCUMENTS

2018/0278454 A1* 9/2018 Islam ................... H04L 27/2655

FOREIGN PATENT DOCUMENTS

WO   WO-2018185995 A1 * 10/2018 ............ H04W 72/12

OTHER PUBLICATIONS

English translation of WO-2018185995-A1 (Year: 2018).*
(Continued)

*Primary Examiner* — Nguyen H Ngo
(74) *Attorney, Agent, or Firm* — BakerHostetler LLP

(57) ABSTRACT

A method of receiving data by a terminal device, comprising: determining an allocation of downlink resources of a wireless radio interface for the reception of data by the terminal device, receiving signals representing the data within the allocated downlink resources, wherein the receiving includes: determining that the allocated downlink resources include at least a portion of a first predetermined resource set, receiving via the wireless radio interface, signals within a first predetermined common pre-emption indicator transmission set of downlink resources allocated for the transmission of a first pre-emption indicator associated with the first predetermined resource set, determining, based on the signals received within the first predetermined common pre-emption indicator transmission set of downlink resources, whether a portion of the signals received within the allocated downlink resources and within the first predetermined resource set comprises data signals transmitted to a different terminal device.

10 Claims, 10 Drawing Sheets

(58) Field of Classification Search
USPC .... 370/229, 230, 230.1, 236, 252, 328, 329,
370/330, 395.4, 395.42, 436, 442, 443,
370/444, 458, 462, 468, 529
See application file for complete search history.

(56) References Cited

OTHER PUBLICATIONS

International Search Report and Written Opinion dated Sep. 20, 2018 for PCT/EP2018/064763 filed on Jun. 5, 2018, 7 pages.
Apple Inc., "eMBB and URLLC Multiplexing for NR", 3GPP Draft; R1-1708279, 3GPP TSG-RAN WG1 #89 Hangzhou, China, May 15-19, 2017, pp. 1-5.

* cited by examiner

INFRASTRUCTURE EQUIPMENT, TERMINAL DEVICE AND METHODS

CROSS-REFERENCE TO RELATED APPLICATIONS

The present application is based on PCT filing PCT/EP2018/064763, filed Jun. 5, 2018, which claims priority to EP 17176495.4, filed Jun. 16, 2017, and EP 17196256.6, filed Oct. 12, 2017, the entire contents of each are incorporated herein by reference.

FIELD

The present disclosure relates to terminal devices configured to receive data from infrastructure equipment of a wireless communications network in the presence of other transmissions. The present disclosure also relates to Infrastructure equipment for forming part of a wireless communications network and methods of receiving data at a communications terminal and for transmitting data to a terminal device.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly. However, whilst fourth generation networks can support communications at high data rate and low latencies from devices such as smart phones and tablet computers, it is expected that future wireless communications networks will be expected to efficiently support communications with a much wider range of devices associated with a wider range of data traffic profiles, for example including reduced complexity devices, machine type communication devices, high resolution video displays and virtual reality headsets. Some of these different types of devices may be deployed in very large numbers, for example low complexity devices for supporting the "Internet of Things", and may typically be associated with the transmissions of relatively small amounts of data with relatively high latency tolerance, whereas other types of device, for example supporting high-definition video streaming, may be associated with transmissions of relatively large amounts of data with relatively low latency tolerance.

There is therefore expected to be a desire for future wireless communications networks, which may be referred to as 5G or new radio (NR) system/new radio access technology (RAT), networks, to efficiently support connectivity for a wide range of devices associated with different applications with different characteristic data traffic profiles, resulting in different devices having different operating characteristics/requirements, such as:
  High latency tolerance
  High data rates
  Millimetre wave spectrum use
  High density of network nodes (e.g. small cell and relay nodes)
  Large system capacity
  Large numbers of devices (e.g. MTC devices/Internet of Things devices)
  Low device cost and energy consumption
  Flexible spectrum usage
  Flexible mobility
  Ultra-reliable and Low latency (e.g. for vehicle safety applications, such as self-driving cars).

A 3GPP Study Item (SI) on New Radio Access Technology (NR) [1] has been completed and a Work Item (WI) has been agreed to specify functionalities for NR [2] which would be the new Radio Access Technology (RAT) for such a next generation wireless communication system. The new RAT is expected to operate in a large range of frequencies and it is expected to cover a broad range of use cases. Example use cases that are considered under this SI are:
  Enhanced Mobile Broadband (eMBB)
  Massive Machine Type Communications (mMTC)
  Ultra Reliable & Low Latency Communications (URLLC)

eMBB services are typically high capacity services with a requirement to support up to 20 Gb/s. For efficient transmission of large amounts of data at high throughput, eMBB services are expected to use a long scheduling time so as to minimise the overhead, where scheduling time refers to the time available for data transmission between allocations. In other words, eMBB services are expected to have relatively infrequent allocation messages and to have longer time period allocated to data transmission in-between allocation messages.

On the other hand URLLC services are low latency services, wherein the latency is measured from the ingress of a layer 2 packet to its egress from the network, with a proposed target of 1 ms. URLLC data is generally expected to be short such that smaller scheduling times are generally expected compared to eMBB transmissions. As the skilled person will understand, eMBB transmissions and URLLC transmissions have different requirements and expectations, wherein high capacity and low overhead is desired for one while low latency is desired for the other.

It is therefore challenging to conceive a system which can accommodate both needs and where these two very different types of transmissions can be transmitted in a satisfactory manner.

SUMMARY

The present disclosure can help address or mitigate at least some of the issues discussed above.

According to the present technique there is provided a method of receiving data by a device, comprising determining an allocation of downlink resources of a wireless radio interface for the reception of data by the device, A method of receiving data by a terminal device, comprising determining an allocation of downlink resources of a wireless radio interface for the reception of data by the terminal device and receiving signals representing the data within the allocated downlink resources. The receiving includes determining that the allocated downlink resources include at least a portion of a first predetermined resource set, receiving via the wireless radio interface, signals within first predetermined common pre-emption indicator transmission resources allocated for the transmission of a first pre-emption indicator associated with the first predetermined resource set, and determining, based on the signals received within the first predetermined common pre-emption indicator transmission resources, whether a portion of the signals received within the allocated downlink resources and within the first predetermined resource set comprises data signals transmitted to a different terminal device.

According to the present disclosure, example embodiments of the present technique can provide arrangements and systems where high capacity and low latency transmissions can be communicated at the same time while improving resources utilisation for each type of transmission. For example, where eMBB data whose transmission resources (or portion thereof) are used for transmitting a URRLC service, unexpected errors in decoding the eMBB data can be reduced by providing an indication of the transmission resources in which the URRLC service was transmitted, can therefore improve a likelihood of correctly receiving the eMBB data.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DESCRIPTION OF EXAMPLES

Figure 1:
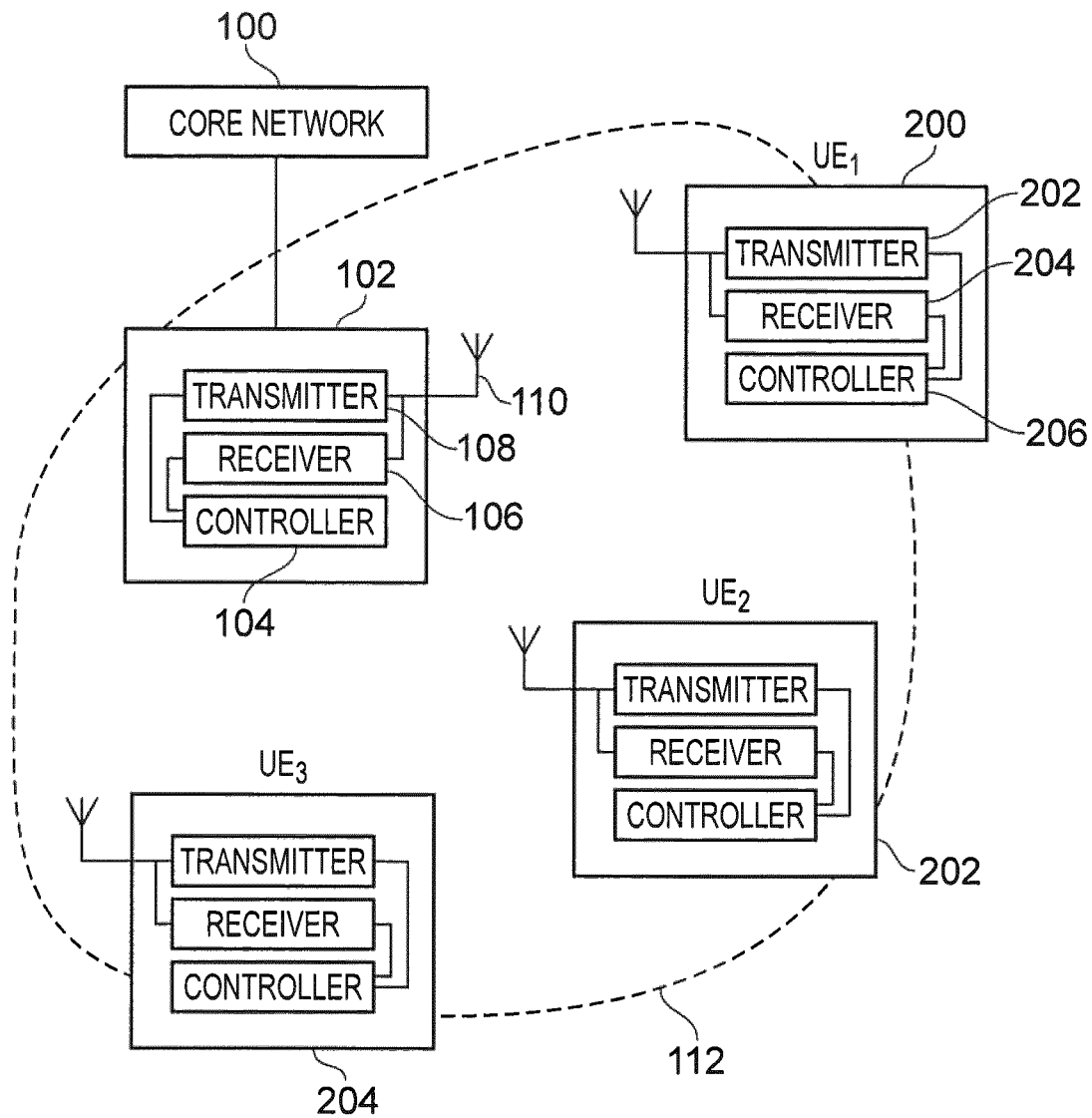
FIG. 1 schematically represents some elements of a conventional LTE-based mobile telecommunications network/system.

FIG. 1 shows a wireless mobile communications architecture which may be adapted to provide functionality in accordance with embodiments of the disclosure described herein. The network shown in FIG. 1 comprises a core network 100 connected to a base station 102. The base station 102 comprises a controller 104, a receiver 106 and a transmitter 108. The transmitter and the receiver are connected to radiating elements forming an antenna 110. The base station 102 thus generates a coverage area or a cell 112 and provides connectivity to first, second and third terminal devices 200, 202 and 204 by means of a wireless radio interface.

Each of the terminal devices 200, 202, 204 comprises a transmitter 202, a receiver 204 and a controller 206 which together operate to transmit and receive data to and from the base station 102 and hence to communicate data via the core network 100.

The first device 200 comprises a transmitter unit 202 (which when embodied as circuitry may be referred to as "transmitter circuitry") for transmission of wireless signals, a receiver unit 204 (which when embodied as circuitry may be referred to as "receiver circuitry") for reception of wireless signals and a processor unit 206 configured to control the device 200. The processor unit 206 (which when embodied as circuitry may be referred to as "control circuitry") may comprise various sub-units for providing functionality in accordance with embodiments of the present disclosure as explained further herein. These sub-units may be implemented as discrete hardware elements or as appropriately configured functions of the processor unit. Thus the processor unit 206 may comprise a processor unit which is suitably configured/programmed to provide the desired functionality described herein using conventional programming/configuration techniques for equipment in wireless telecommunications systems. The transmitter unit 202, the receiver unit 204 and the processor unit 206 are schematically shown in FIG. 1 as separate elements for ease of representation. However, it will be appreciated that the functionality of these units can be provided in various different ways, for example using a single suitably programmed general purpose computer, or suitably configured application-specific integrated circuit(s)/circuitry. It will be appreciated the terminal device 200 will in general comprise various other elements associated with its operating functionality, for example a power source, user interface, and so forth, but these are not shown in FIG. 1 in the interests of simplicity.

In FIG. 1, the transmitter, receiver and antenna of the base station 102 are shown as collocated with the controller 104; in some architectures the transmitter, the receiver and the antenna may be separated from the controller and/or each other to form a distributed architecture.

In the architecture shown in FIG. 1, the base station 102 is shown as controlling a single antenna 110, however in some architectures a single base station such as the base station 102 may act as a controller for multiple transmitters and multiple receivers and hence multiple antennas, some or all of which may be located remotely from the base station 102. As such the base station 102 may generate the cell 112 by means of multiple antennas. For example, in accordance with a network architecture for a new radio access technology (RAT), which may be adapted to provide functionality in accordance with embodiments of the disclosure described herein, a communication cell may comprise a controlling node in communication with a plurality of distributed units (radio access nodes/remote transmission and reception points (TRPs)).

Data is transmitted from the base station 102 to the terminal devices 200, 202, and 204 within the coverage area 112 via a radio downlink. Data is transmitted from the devices to the base station via a radio uplink. The core network 100 routes data to and from the devices via the base station and provides functions such as authentication, mobility management, charging and so on. Devices may also be referred to as terminal devices, mobile stations, user equipment (UE), user terminal, mobile radio, communications device, mobile terminals, mobile devices and so forth. Base stations, which are an example of network infrastructure equipment, may also be referred to as transceiver stations/nodeBs/e-nodeBs, infrastructure equipment, gNBs and so forth.

It will be appreciated that operational aspects of the telecommunications network represented in FIG. 1, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The specific wireless telecommunications architecture for a wireless telecommunications system adapted to implement functionality in accordance with the principles described herein is not significant to the principles underlying the described approaches.

In the mobile communications network illustrated in FIG. 1, transmissions may be separated in time and frequency. That is, a transmission may use a set of resources defined in terms of a time period and a frequency range, and different transmissions may use other, non-overlapping resources and may accordingly be received and decoded individually. As such, in the examples described herein, the term 'resources' is used to refer to (jointly) time and frequency resources.

However, the principles described herein may apply to other transmission schemes where a 'resource' may refer to any portion of a range of parameters that may apply to a transmission, such that the use of the same resource for the transmission of two different pieces of information (for example, an eMBB transmission and a ULLRC transmission) is either not feasible or likely to result in severe decrease in the likelihood of successful reception of one or both. Other examples of resources may therefore include orthogonal spreading codes, orthogonal spatial transmission links, and the like. A resource may be defined in terms of a combination of multiple such parameters (as in the examples described herein, wherein a resource is characterized by time and frequency), or may refer to a single dimension (e.g. by reference solely to time).

As discussed above, a mobile communications network such as the network illustrated in FIG. 1 may be used to carry transmissions for services with a variety of constraints, such as high data rate traffic which has some tolerance to delay and traffic which has a low tolerance to delay, which may also have a lower data rate. While the principles of the disclosure will be illustrated in the context of a mobile network where a network element (e.g. TRP, eNB, BTS, . . . ) transmits eMBB and URLLC data to a terminal device, it will be appreciated that the same principles apply to 3G networks, LTE networks or any other suitable network and to any appropriate type or types of data. Likewise, the same principles and teachings can also be used for uplink transmissions from a terminal device to a network receiver (e.g. BTS, eNB, TRP, etc.) or for transmissions between peer devices.

Although the description herein relates to eMBB and URLLC traffic, the disclosure is not so limited. For example, the disclosure is pertinent where the transmission period of the data transmitted to a different device (the URLLC in embodiments) is shorter than the transmission period of the data for which the resources are initially allocated (the eMBB in embodiments) and the data transmitted to the different device uses some or all of the resources initially allocated.

A principle of eMBB data is that in order to reduce the overhead associated with control information, the data transmission occurs over a relatively long time period (e.g. 0.5 ms, 1 ms, 5 ms, 10 ms or 50 ms), and as such the control channel associated with an eMBB transmission uses significantly smaller transmission resources than that of the data channel. In this manner, the relative overhead caused by the transmission of control information is reduced.

On the other hand, in order to meet a low latency requirement associated with a URLLC transmission, the URLLC data resources may be relatively shorter, such as 0.25 ms. An example requirement currently considered for URLLC is a low latency transmission measured from the ingress of a layer 2 packet to its egress from the network, with a proposed target of 1 ms.

Since URLLC is intolerant to latency, it is agreed that URLLC can occupy (that is, be transmitted using) a subset of the resources that have been previously allocated for an eMBB transmission.

Although a URLLC transmission may comprise a relatively smaller amount of data than an eMBB transmission, it may be necessary that, for example in order to meet a latency requirement, a URLLC transmission occupies a very high bandwidth for a short time period.

The bandwidth (i.e. the extent of the transmission resources when measured in the frequency domain) used for a URLLC transmission may therefore exceed that of an eMBB transmission. In particular, the bandwidth used for a single URLLC transmission may span the frequency range used by two or more ongoing eMBB transmissions. As such, a particularly problem arises when a single URLLC transmission uses resources allocated for two or more different eMBB transmissions. This is illustrated in FIG. 2.

Figure 2:
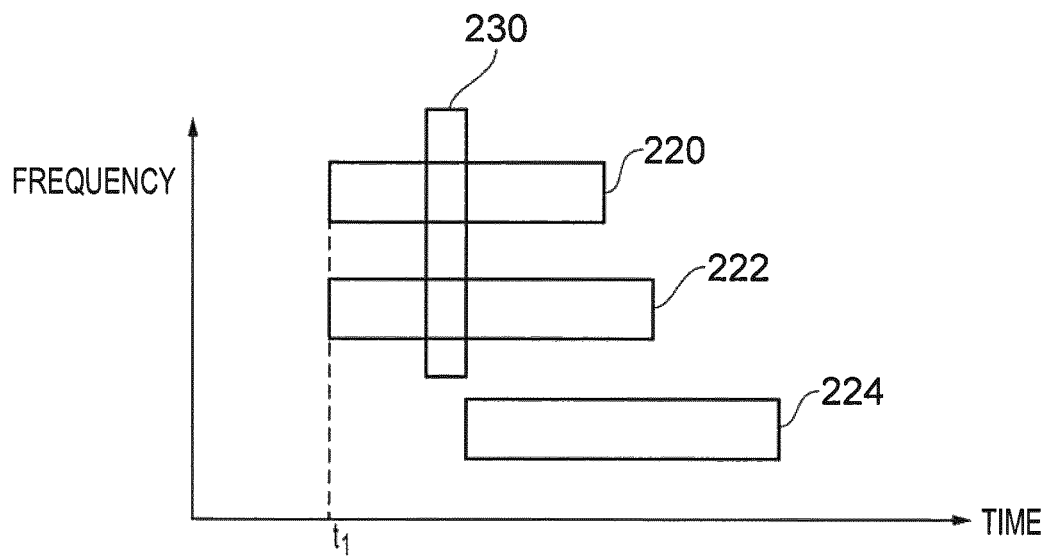
FIG. 2 illustrates resource allocations in the time and frequency domains

FIG. 2 illustrates data transmissions from the base station 102 to the terminal devices 200, 202 and 204. On the horizontal axis is shown a progression of time while the vertical axis shows a frequency range. The data transmissions having a relatively longer time duration 220, 222 and 224 are examples of first, second and third eMBB transmissions while the transmission using a relatively larger frequency range over a shorter time period 230 is an example of a URLLC transmission. In the example shown in FIG. 2, the URLLC transmission 230 uses resources which have been allocated for the first and second eMBB transmissions 220 and 222. The URLLC transmission 230 does not however use any of the resources which are allocated for the third eMBB transmission 224.

FIG. 2 also illustrates a principle that an eMBB transmission typically occurs over a long duration but over a relatively limited frequency range while a URLLC transmission may occupy a much shorter time period but may use a much wider range of frequencies in order to meet the latency requirement of the URLLC data.

It has been agreed that the transmission of a URLLC transmission may use resources previously allocated to eMBB data (i.e. for the transmission of the eMBB data) such as the resources allocated for the first and second eMBB transmissions 220 and 222, in order to ensure that the URLLC transmission 230 is able to meet its latency requirements. This is referred to as 'pre-emption'. However, it will be clear to the skilled person that the possibility of correctly decoding the affected eMBB transmissions 220 and 222 will be negatively impacted by the fact that some portion of the resources which were allocated for their transmission has in fact been used for the transmission of the URLLC data 230.

In order to assist receivers of the eMBB data transmissions 220 and 222, it has been agreed that a pre-emption indicator may be transmitted whenever such an occurrence arises in order to assist the receivers of the eMBB data in decoding the transmissions that they receive.

A pre-emption indicator associated with an individual eMBB transmission and transmitted using resources defined based on the transmission resources for the associated eMBB transmission is described in co-pending European patent application EP16189083.5 filed on 15 Sep. 2016 whose content is incorporated herein by reference.

Figure 3:
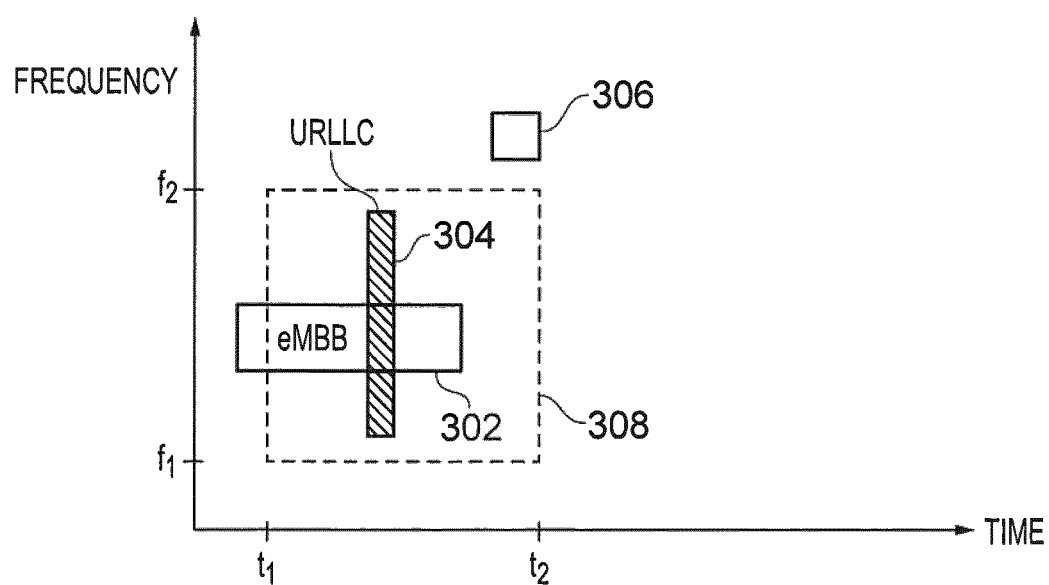
FIGS. 3 to 8 illustrate various arrangements for resource allocations for data transmissions, resource sets and corresponding common pre-emption indicators in accordance with certain embodiments of the disclosure.

FIG. 3 illustrates an example of a pre-emption indicator transmitted in accordance with the present disclosure. In FIG. 3, a portion of the resources allocated for an eMBB transmission 302 (for example to the first device 200) have been used instead for the transmission of a URLLC transmission 304 (for example to the second device 202).

In accordance with the present disclosure a set of resources which may be referred to as a resource set is defined, bounded in time and in frequency. Each resource set has associated with it common pre-emption indicator transmission resources which are defined for the transmission of a common pre-emption indicator such as the common pre-emption indicator 306.

In FIG. 3 the resource set 308 is bounded in the time domain by times t1 and t2 and in the frequency domain by frequencies f1 and f2. Common pre-emption indicator transmission resources 306 are allocated for the transmission of a common pre-emption indicator associated with the resource set 308; that is to say, whenever pre-emption occurs within the boundaries of the resource set 308, this will be indicated by the transmission of a pre-emption indicator using the common pre-emption indicator transmission resources 306.

In some embodiments a pre-emption indicator will always be transmitted using the predetermined common pre-emption indicator transmission resources 306 and will indicate whether or not any pre-emption has occurred within the associated resource set 308. In further embodiments the absence of a transmission of a pre-emption indicator using the predetermined common pre-emption indicator transmission resources 306 indicates that no pre-emption has occurred within the resource set 308. In some example embodiments a pre-emption indicator may be transmitted if any URLLC is transmitted using resources within this resource set regardless of whether the URLLC pre-empts any eMBB transmission within the resource set.

The common pre-emption indicator may be transmitted on a physical downlink control channel (PDCCH) and may be transmitted using a common downlink control indicator (DCI). The device may blind decode the common pre-emption indicator.

FIG. 3 shows a single instance of pre-emption occurring within a resource set. However, multiple such pre-emptions may occur within the resource set: either because multiple URLLC transmissions use resources allocated for one or more eMBB transmissions, because a single URLLC transmission uses resources allocated for different eMBB transmissions, or a combination of the two. Regardless, a common pre-emption indicator associated with a resource set provides an indication of all of the pre-emptions which occur within the boundaries of the resource set, which may be received and decoded by the respective recipients of the pre-empted eMBB data transmission or transmissions.

In general, a device which receives signals transmitted within the common pre-emption indicator transmission resources 306 is able to determine whether or not pre-emption has occurred within the corresponding resource set 308.

In the event of pre-emption occurring within the resource set 308, the common pre-emption indicator transmitted in the common pre-emption indicator transmission resources 306 may indicate one or more of the following:

a) whether or not pre-emption of one or more eMBB transmissions by one or more URLLC transmissions has occurred within the resource set;

b) a subset of the resources within the resource set that includes the set of resources allocated for eMBB transmission that were used for URLLC transmission;

c) the resources within the resource set that were allocated for eMBB transmission which were used for URLLC transmission;

d) the resources used for the URLLC transmission(s) that resulted in pre-emption;

e) the resources used for each URLLC transmission which used resources falling within the resource set;

f) the resources used for each URLLC transmission which falls within the resource set, regardless if it resulted in pre-emption.

It will be appreciated that a significant reduction in the amount of resources required for transmitting pre-emption information can be achieved by means of a common pre-emption indicator, compared with transmitting a separate pre-emption indicator for every affected eMBB transmission or for every URLLC transmission which results in pre-emption (or both). It will be further appreciated that by grouping resources into resource sets, the amount of information needed to be conveyed in a single common pre-emption indicator is kept to a lower amount compared with, for example, conveying the location of a URLLC transmission within the full system bandwidth and/or within an indefinite time period. Similarly, dividing resources into resource sets will reduce the number of URLLC transmissions that must be reflected in any given common pre-emption indicator.

Where one or more subsets of the resources within the resource set are indicated within a common pre-emption indicator, the granularity with which the resources are indicated may be sufficient to precisely indicate the relevant resources (i.e. the portion or portions of the eMBB transmission which were pre-empted by one or more URLLC transmissions). In some embodiments, in order to reduce the amount of information required to be transmitted within a common pre-emption indicator, the resource set may be sub-divided and the one or more sub-divisions of the resource set may be indicated, the sub-divisions being those containing the relevant resources. A dimension of a sub-division may be based on a characteristic of a URLCC transmission (e.g. the time dimension of a sub-division may correspond to the duration of a URLLC transmission). The dimensions of a sub-division may be pre-determined fractions of the corresponding dimension of the resource set.

The dimensions of the sub-division are configured and known in advance by the terminal device 200, e.g. by means of signalling received from the base station 102.

The device to whom the eMBB transmission is addressed may, based on the indication of the occurrence of pre-emption, puncture out a portion of the transmission (i.e. zero out the corresponding LLRs) or otherwise process the received signals in order to improve the probability of successfully decoding all or part of the eMBB transmission.

Depending on the information conveyed by the common pre-emption indicator, the receiving device may be able to determine exactly the affected resources, or a superset of the affected resources. It may combine the information received in the common pre-emption indicator with stored knowledge regarding the extent of the resource set and/or the extent of the resources allocated for the eMBB transmission, to determine a subset of the eMBB signals which have been (or may have been) pre-empted. For example, if the common pre-emption indicator indicates the extent of the URLLC transmission 304, and the UE has stored the resources 302 used for the eMBB transmission, the UE is able to determine the portion of the eMBB signals which were affected by the pre-emption by the URLLC transmission as the intersection of the resources 302 and URLLC transmission 304.

In the embodiment illustrated in FIG. 3, the common pre-emption indicator transmission resources 306 used for the transmission of a common pre-emption indicator are outside the region of the associated resource set 308. In other embodiments, the resources used for the transmission of a common pre-emption indicator are a subset of the associated resource set, such as the common pre-emption indicator transmission resources 506 illustrated in FIG. 5.

Figure 8:
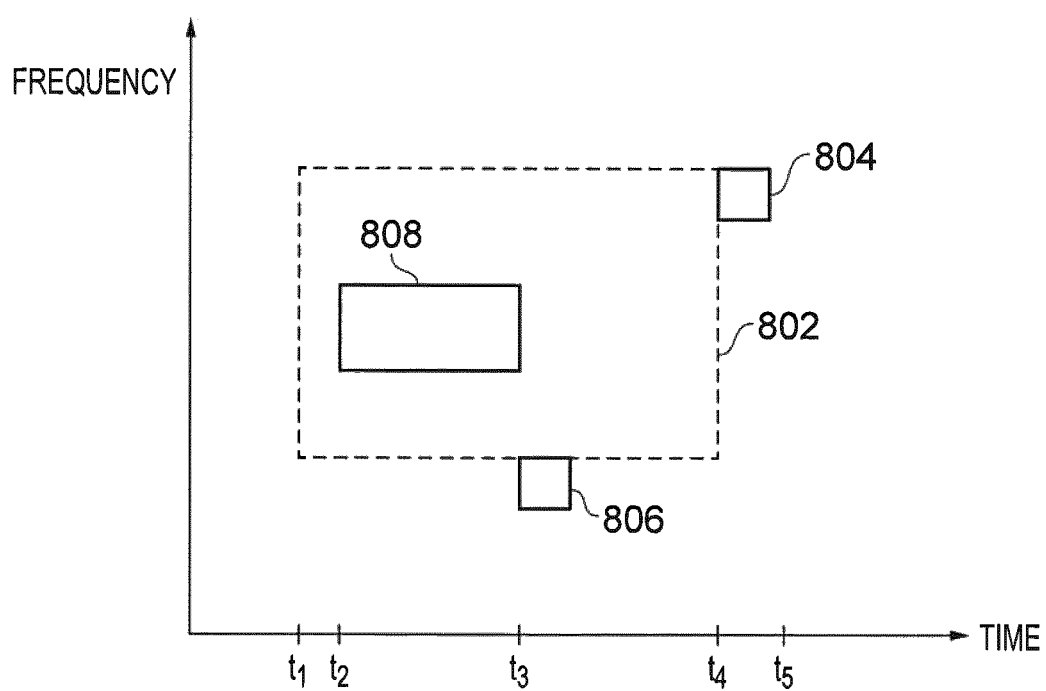

In some embodiments, a pre-emption indicator is transmitted after (i.e. later in time) than the latest (in time) resources in the associated resource set (e.g. after time t2 in FIG. 3). Preferably, in order to minimize the delay between a receiving device completing the reception of an eMBB transmission and the device being able to determine whether the eMBB transmission was subject to pre-emption, a common pre-emption indicator is transmitted substantially aligned in time with the end (in time) of the associated resource set. In order to simplify processing at a base station, a pre-emption indicator may be transmitted starting at the end (in time) of the associated resource set as illustrated in FIG. 8 (described below). Recognizing that the transmission time of a URLLC transmission may not be known to a gNB or a base station beforehand and that a common pre-emption indicator preferably indicates all pre-emptions occurring within the corresponding resource set, the common pre-emption indicator is preferably transmitted at the end of (and within) a resource set, or later using resources outside of the resource set.

In the embodiments illustrated, each resource set is associated with one common pre-emption indicator. In some (not shown) embodiments, multiple pre-emption indicators may be transmitted, indicative of any pre-emption that occurred within the resource set. This may improve the likelihood that the pre-emption information can be successfully decoded. Preferably in this case, the common pre-emption indicators are transmitted substantially simultaneously, in order to minimize latency, and preferably using resources separated in frequency in order to provide frequency diversity. Alternatively, the common pre-emption indicators are transmitted at different times within the resource set.

The first device 200 may attempt to decode a single instance of a given common pre-emption indicator, or may attempt to receive multiple instances. In some embodiments, different groups of devices are configured to monitor different common pre-emption indicator transmission resources associated with a given resource set. A group of devices may be configured to monitor one, or multiple common pre-emption indicator transmission resources.

Figure 4:
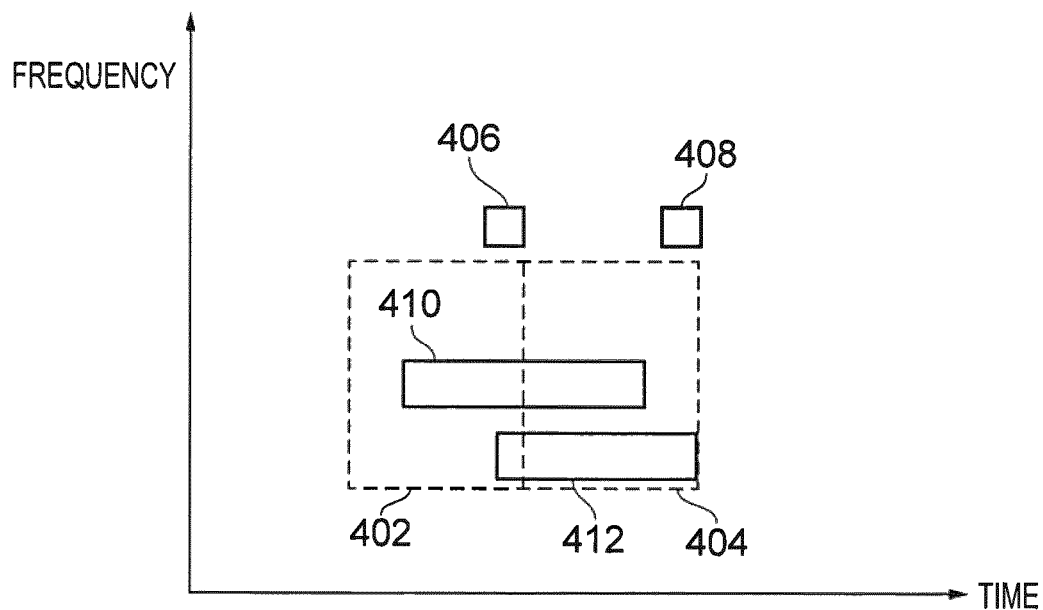

FIG. 4 illustrates a first resource set 402 and a second resource set 404 and associated common pre-emption indicators 406 and 408 respectively. FIG. 4 shows a first eMBB transmission 410 and a second eMBB transmission 412 and illustrates the possibility that, in some embodiments, an eMBB transmission may use resources falling within the boundaries of multiple resource sets. In the example illustrated in FIG. 4 the eMBB transmission 410 may be transmitted to the first device 200. In order to determine whether the eMBB transmission 410 has been the subject of pre-emption by one or more URLLC transmissions the first device 200 receives the signals transmitted in the common pre-emption indicator transmission resources associated with both of the common pre-emption indicators 406 and 408 and may thus determines whether any pre-emption had occurred within the boundaries of the associated resource sets 402 and 404.

Based on the common pre-emption indicators 406 and 408 the device 200 may determine, in the example illustrated in FIG. 4, that no pre-emption occurred in either of the resource sets 402 and 404.

In the event that the device determined, based on one or more of the common pre-emption indicators 406 and 408, that pre-emption had occurred, the receiving device 200 may apply additional processing to the signals received on the resources allocated for the eMBB transmission 410 in order to increase the likelihood of error-free decoding. Such processing may include puncturing the affected data or setting to '0' the indicated LLRs.

Figure 5:
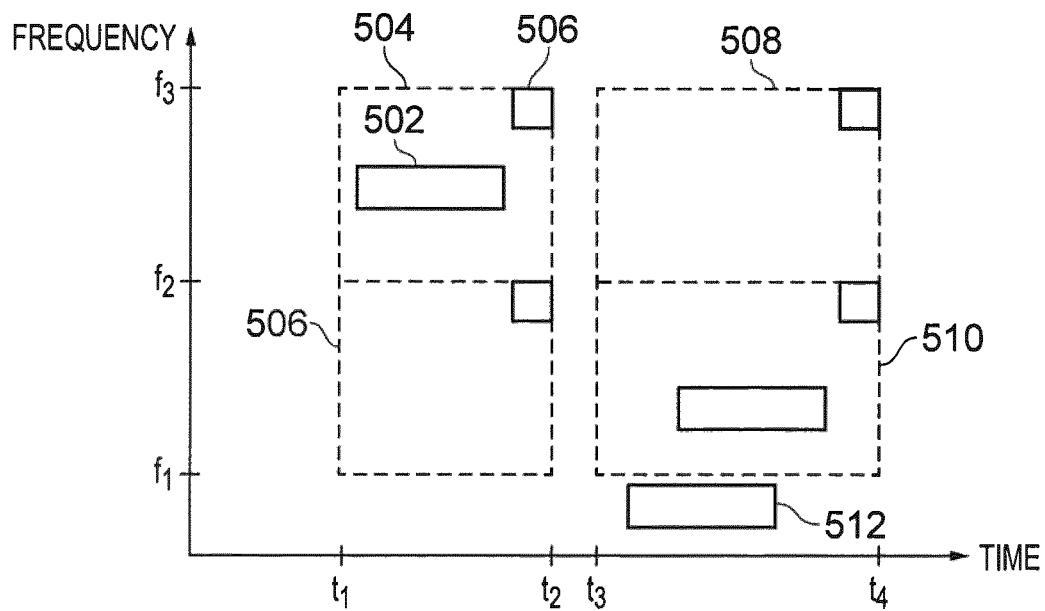

FIG. 5 illustrates further aspects of the present disclosure. In particular FIG. 5 illustrates the possibility that eMBB transmissions and resource sets are configured such that each eMBB transmission is allocated resources which fall entirely within at most one resource set. For example, the eMBB transmission 502 may use resources which fall entirely within the resource set 504.

As such, for example, the first device 200, having determined that resources 502 have been allocated for the transmission of eMBB transmission 502 from the base station 102 to the device 200, needs only to receive a single pre-emption indicator, such as the pre-emption indicator 506, in order to determine whether pre-emption has occurred in respect of a given eMBB transmission.

In some embodiments of the present disclosure the resources which make up each resource set and the location of the pre-emption indicator in the time and frequency domain are configured according to a specification, such as a specification drafted by the Third Generation Partnership (3GPP®) project. In yet further embodiments the definition of the resource set boundaries and/or their associated pre-emption indicator locations is configured by the network and transmitted for example as part of system information or by means of a radio resource control (RRC) message (such as an RRC Reconfiguration Message or the like) by the base station 102.

In some embodiments, the resources which make up each resource set are preferably defined in terms of the time- and frequency-domain boundaries of each resource set, and may be known in advance to both the network and to a device which may be allocated resources for receiving eMBB data, where the resources may be pre-empted by the transmission of URLLC data.

The first device 200 may therefore determine, based on, for example, signals received from the base station 102, the resource set 504 in which the eMBB transmission 502 falls, and the device 200 is similarly able to determine the common pre-emption indicator transmission resource location for the pre-emption indicator 506 associated with the resource set 504. As noted further below, in another embodiment a control signal allocating the eMBB resources for the first device also indicates which common pre-emption indicator to monitor.

In another embodiment a common control signal (e.g. group common PDCCH) that carries an indicator, e.g. which may be referred to as a Slot Format Indicator, may signal the presence or absence of at least one common pre-emption indicator in the corresponding slot. The Slot Format Indicator may indicate a structure of the relevant slot, e.g. a number of symbols for downlink and uplink, a DMRS (demodulation reference signal) structure, and so on. In such an example embodiment, the structure of the common pre-emption indicator may also be signalled.

In some embodiments, a common pre-emption indicator may be transmitted using a common control channel, such as a group common PDCCH, which is also used to indicate a structure of the relevant slot, e.g. indicating one or more of a number of symbols for downlink and uplink, a DMRS (demodulation reference signal) structure, and so on. For example, the common pre-emption indicator may share a DCI or a group common PDCCH with a Slot Format Indicator. The common pre-emption indicator may thus indicate whether pre-emption has occurred in one or more slots prior to the slot with which the slot format indicator is associated.

In some embodiments, the device 200 need not be able to determine the boundaries of each resource set, provided that the device is able to determine at least one common pre-emption indicator transmission resource location which may carry a common pre-emption indicator relevant to each eMBB transmission which it receives.

In some examples, the common pre-emption indicator can implicitly or explicitly indicate the boundaries of its resource set. In some examples using an implicit indication, the start and end boundaries of the resource set are relative to the location of the common pre-emption indicator.

Thus, in some embodiments, the device 200 determines the extent of a resource set based on the determined common pre-emption indicator transmission resource location. For example, the device 200 determines, for example, in accordance with a standard, or based on signalling received from the base station 102, that a common pre-emption indicator transmission resource location uses resources starting at time t1 and at frequency f1. Based on this, the device determines that the corresponding resource set extends from time t1−T to t1 and from f1−F to f1 in the frequency domain, where T and F are parameters known in advance to the device. The parameters T and F may be specified in a standard or communicated to the device from the base station, for example in broadcast system information, system information communicated by means of unicast or multicast transmission or by means of RRC signalling (e.g. such as in an RRC Reconfiguration message). In other embodiments, a different function may be used to determine the extent of a resource set based on the resources used to transmit the common pre-emption indicator; for example there may be a defined gap in frequency and or time between the resource set and the pre-emption indicator transmission resources.

In yet other example embodiments, the common pre-emption indicator itself indicates explicitly the extent of the resource set. For example, in the example of FIG. 5, the common pre-emption indicator transmitted in the first common pre-emption indicator transmission resources 506 may indicate that the associated resource set extends from time t1 to time t2, and from frequency f2 to frequency f3.

In some examples, the extent of a resource set may be determined based on a combination of the location of a common pre-emption indicator transmission resources and information indicated by the common pre-emption indicator. For example, the common pre-emption indicator transmitted at 506 may indicate one or more of the magnitude of (t1−t2) i.e. the duration of the associated resource set and the magnitude of (f3−f2) i.e. the frequency range of the resource set. Based on the frequency f3 and time t2 associated with the common pre-emption indicator transmission resources, the device is able to determine the extent of the associated resource set.

FIG. 5 also illustrates that in some embodiments, resource sets may not be contiguous in the time and/or the frequency domains. For example, as shown in FIG. 5, two resource sets 504 and 506 are shown as being contiguous and adjacent in the frequency domain and both covering the time period between t1 and t2. Further resource sets 508 and 510 cover the same frequency ranges as the first resource sets 504 and 506 respectively and the time period from t3 to t4.

In general, the resource set boundaries may be configured so as not to cover all possible time and frequency resources which are available for downlink data transmission. For example, the frequency range or ranges which fall within the scope of the resource sets may vary over time.

In particular the network may configure resource sets to cover the portion(s) of the time and frequency resources limited to those resources in which URLLC transmissions may pre-empt eMBB data transmission. That is, the network may configure the resource sets such that time and/or frequency resources in which only eMBB transmissions may occur, or in which only URLLC transmissions can occur, are not associated with any resource set.

This further reduces the overhead associated with pre-emption signalling, since common pre-emption indicator signalling resources are not needed for resources where no pre-emption can possibly occur and hence are not associated with any resource set.

FIG. 5 illustrates benefits of partitioning system resources into resource sets, compared with, for example, a single resource set covering all of the system bandwidth from time t1 to time t4. First, frequency or time resources (such as the time period between t2 and t3) in which pre-emption cannot occur need not be associated with a pre-emption indicator. In addition, within the time period from t1 to t4 there can be multiple URLLC transmission and the pre-emption indicator would need to cater for this, which would result in either an increase the number of bits within a DCI, or the base station 200 or a gNB having to transmit multiple DCIs (i.e. multiple PDCCH) within the common search space.

The first device 200 may therefore determine, for example, that the eMBB transmission 512 falls outside of any resource set and therefore is not subject to the possibility of pre-emption by a URLLC transmission.

Additionally or alternatively, the network may take into account the scope and location of configured resource sets when scheduling eMBB transmissions and URLLC transmissions. In particular, when receiving a URLLC for transmission it may determine that it is restricted to transmitting the URLLC data either within time and frequency resources which are dedicated for the transmission of URLLC data, or—if it is to result in the pre-emption of an ongoing eMBB transmission—within resources bounded by one or more resource sets. The URLLC transmission may be thus scheduled and transmitted in accordance with the pre-configured resource sets.

In some embodiments the duration of each resource set is constant, and the common pre-emption indicator may therefore occur periodically.

In some embodiments the resource set boundaries may repeat in time and/or frequency according to a pattern. As described above, it may not be necessary for resource sets to cover all time periods and all of the system bandwidth; as such, the repeating pattern may include resources that are not associated with any resource set.

Figure 6:
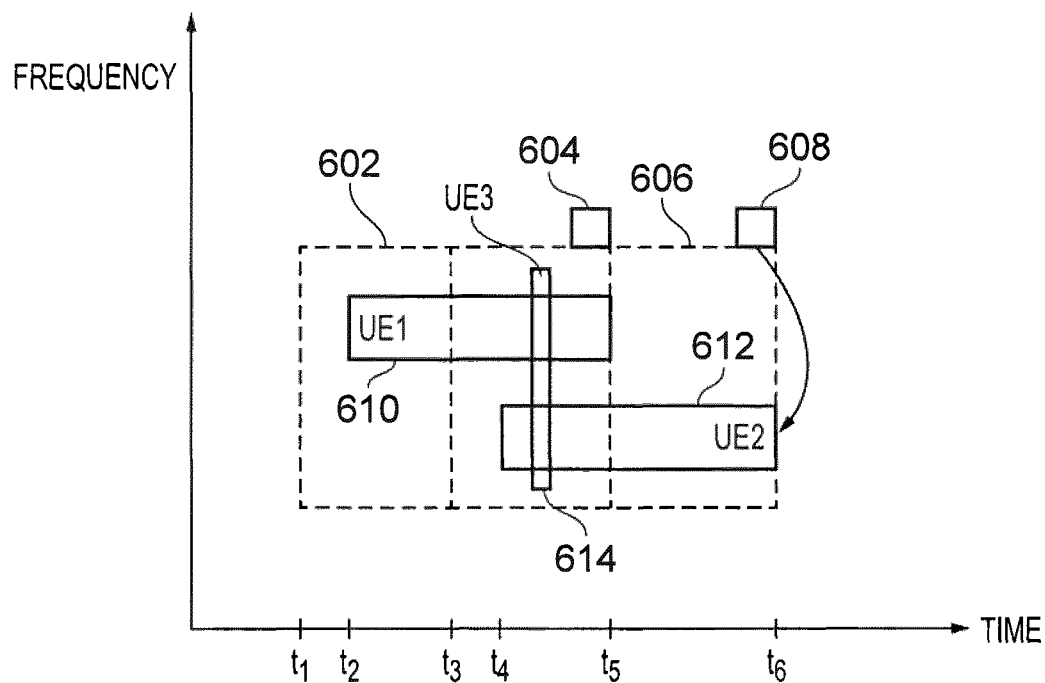

FIG. 6 illustrates yet another embodiment of the disclosure in which two or more resource sets may be configured to be overlapping in time and/or frequency. In FIG. 6 a first resource set 602 is illustrated starting at time t1 and continuing to time t5. A second resource set 606 begins at t3 and ends at time t6. As such the time period between t3 and t5 falls within both the first resource set 602 and the second resource set 606. In the example illustrated in FIG. 6, each resource set has an associated pre-emption indicator. A first common pre-emption indicator is associated with the first resource set 602 and is transmitted using first common pre-emption indicator transmissions resources 604 and a second common pre-emption indicator is associated with the second resource set 606 and is transmitted using second common pre-emption indicator transmissions resources 608. In the embodiment illustrated in FIG. 6 each of the common pre-emption indicators 604 and 608 indicates whether pre-emption has occurred within the associated resource sets 602 and 606.

In the example illustrated in FIG. 6 pre-emption occurs which impacts a first eMBB transmission 610 and a second eMBB transmission 612. A URLLC transmission 614 uses resources allocated to both the first and second eMBB transmissions 610 and 612. Since the pre-emption occurs in both resources sets 602 and 606, corresponding indicators will be transmitted as part of both of the common pre-emption indicators 604 and 608.

The first device 200 which is receiving the first eMBB transmission 610, determines which common pre-emption indicator or indicators need to be decoded in order to determine whether or not pre-emption has occurred in respect of the first eMBB transmission 610.

In the example in FIG. 6, the device 200 which is receiving the first eMBB transmission 610 may determine that the first transmission 610 falls fully within the boundaries of the first resource set 602 and therefore decodes the first common pre-emption indicator transmitted using the first common pre-emption indicator transmissions resources 604. Based on the contents of the pre-emption indicator the device is able to determine that pre-emption occurred within the bounds of the resource set 602 and thus processes the received eMBB data accordingly.

Similarly the second device 202 receiving the second eMBB transmission 612 may determine that that eMBB transmission 612 falls entirely within the bounds of the second resource set 606 and may therefore decode the common pre-emption indicator transmitted in the second common pre-emption indicator transmissions resources 608. Based on decoding the common pre-emption indicator transmitted using the second common pre-emption indicator transmissions resources 608 the device 202 determines that pre-emption occurred within the resource set 606 and therefore processes the received eMBB data accordingly.

The latency between the end of an eMBB transmission and the reception of a pre-emption indicator which may relate to that eMBB transmission can thus be minimised by the use of overlapping resource sets. In addition, according to such an arrangement, it may be possible for a device which receives an eMBB transmission to obtain all necessary pre-emption information relating to the eMBB transmission by decoding a single common pre-emption indicator.

Figure 7:
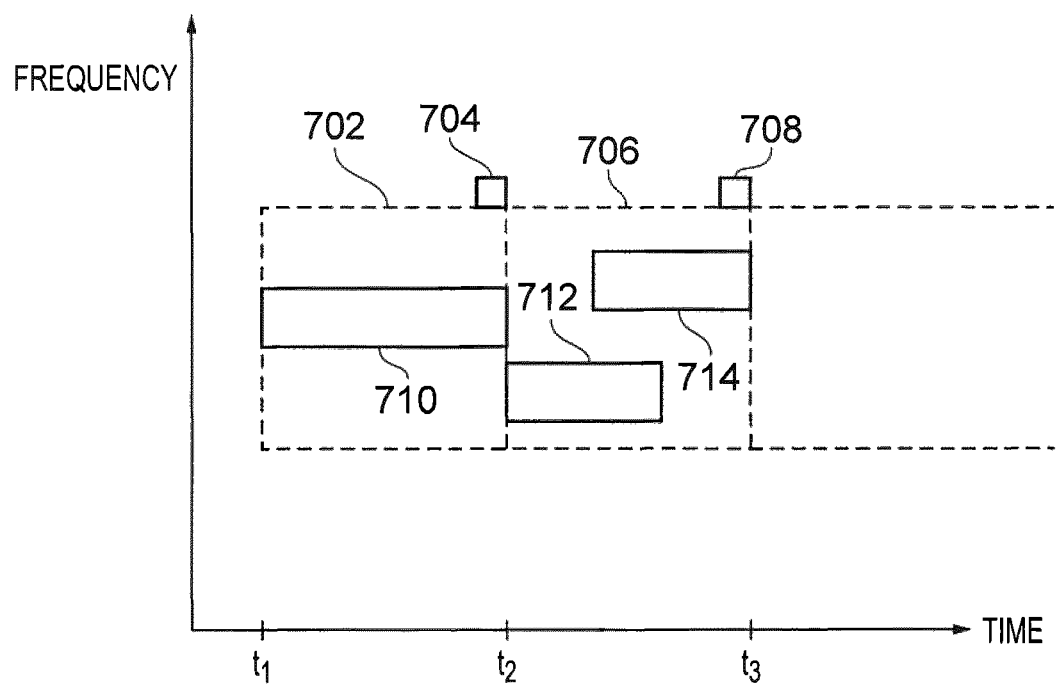

FIG. 7 illustrates yet another arrangement of resource sets in accordance with an embodiment of this disclosure. In FIG. 7, each resource set is configured to span, in the time domain, a period no shorter than (and preferably equal to) a longest possible time period for the transmission of an eMBB data transmission. Furthermore, resource sets and eMBB transmissions may be aligned such that each of the eMBB transmissions 710, 712 and 714 fall wholly within a single resource set.

This configuration has the benefit of reducing the number of pre-emption indicators that need to be transmitted for a given set of resources, and furthermore in ensuring that the first device 200 is required to decode only a single pre-emption indicator for each eMBB data transmission which it is receiving. For example, the first device 200 which is receiving the first eMBB data transmission 710 which is transmitted wholly within the first resource set 702 is able to decode the corresponding first common pre-emption indicator 704 and, based on that single pre-emption indicator, is able to determine whether or not any pre-emption occurred in respect of the eMBB transmission 710.

Each eMBB transmission may be aligned to finish substantially at the same time as the end time of a resource set, in order to minimize the latency between the end of the eMBB transmission and the transmission of the common pre-emption indicator corresponding to the resource set in which the eMBB transmission took place. Alternatively or additionally, each eMBB transmission may be aligned to start substantially at the same time as the start time of a resource set. Consecutive resource sets may thus be configured to align with the start of consecutive eMBB transmission time intervals (TTI).

Each common pre-emption indicator (such as the common pre-emption indicators 704 and 708) is associated with a pre-determined resource set (such as the resource sets 702 and 706 respectively). However, being independent of any individual eMBB transmission, this may lead to a delay between a device receiving the end of an eMBB transmission and being able to determine whether pre-emption has occurred during that transmission.

For example, a device receiving the second eMBB transmission 712 of FIG. 7 may not be able to determine until after the reception of the common pre-emption indicator 708 associated with the second resource set 706 whether the eMBB transmission 712 was affected by pre-emption. In order to mitigate this, and to ensure that a device receiving an eMBB transmission has timely notification of the possibility of pre-emption, a further embodiment is illustrated in FIG. 8.

FIG. 8 shows a pre-determined resource set 802 which covers the resources bounded in time by times t1 and t4. Within that resource set an eMBB transmission 808 is transmitted between times t2 and t3. The location of the transmission of a pre-emption indicator associated with the resource set 802 is indicated at 804. As will be appreciated, there is a time delay between the end of the eMBB transmission 808 at time t3 and the end of the transmission of the associated pre-emption indicator at time t5.

The network may transmit a further pre-emption indicator which is specific to an individual eMBB transmission. This may be referred to as a supplementary pre-emption indicator. This may be transmitted in order to reduce the latency associated with the determination of pre-emption associated with a given eMBB transmission, or because a device may not otherwise determine that pre-emption has occurred in respect of an eMBB transmission.

The resources used for the transmission of a supplementary pre-emption indicator may be determined based on the resources allocated for the eMBB transmission and may additionally be determined based on the resource set in which the eMBB transmission occurred. In the example shown in FIG. 8 the supplementary pre-emption indicator 806 is transmitted starting at time t3, immediately following the end of the eMBB transmission and using spectrum adjacent to, but lower in frequency than, the lower frequency boundary of the resource set 802 in which the eMBB transmission occurred. The skilled person will recognize that the resources used for the supplementary pre-emption indicator may be varied from this particular example, provided that the resources are known in advance to the recipient of the eMBB data.

The supplementary pre-emption indicator 806 may indicate only whether the eMBB transmission 808 was subject to pre-emption. This is in contrast to the common pre-emption indicator 804 which is associated with the resource set 802, and indicates any instance of pre-emption occurring within the resource set 802.

A benefit of this approach is that a device receiving an eMBB transmission may determine more quickly whether pre-emption has occurred in respect of that transmission.

In another example embodiment, a supplementary pre-emption indicator may be transmitted if a URLLC pre-empting an eMBB transmission is outside the boundaries indicated by a common pre-emption indicator. That is, a device may monitor a single common pre-emption indicator and only a portion of the allocated eMBB transmission resources falls within the resource set associated with the common pre-emption indicator then the device may not determine that any URLLC pre-emption has occurred on the portion that falls outside of the resource set. In such example embodiments, a supplementary pre-emption indicator may be transmitted if pre-emption occurs in the remaining portion of the eMBB transmission that falls outside of this resource set. The transmission of the supplementary pre-emption indicator may be indicated by the common pre-emption indicator. In another embodiment the supplementary pre-emption indicator may be monitored and decoded by the device if its eMBB resources falls outside resource sets not covered by any common pre-emption indicator.

In some embodiments, the supplementary pre-emption indicator 806 may indicate only whether a portion or portions of the eMBB transmission 808 which do not fall within a resource set for which the device is configured to monitor the associated common pre-emption indicator transmission resources were subject to pre-emption. As a result, a device may be made aware of a pre-emption occurrence even though it did not monitor the common pre-emption indicator transmission resources associated with each of the resource sets in which the eMBB transmission resources were allocated.

It should be appreciated that a supplementary pre-emption indicator may be transmitted to a specific device or to a group of devices in different example implementations. That is to say, in some embodiments a supplementary pre-emption indicator may be decoded by more than one device, the group of more than one device being configured in advance.

In some embodiments, a notification of the transmission of a supplementary pre-emption indicator may be transmitted within a common pre-emption indicator.

In accordance with yet a further embodiment of the present disclosure, an algorithm at the network determines whether it is necessary to transmit a supplementary pre-emption indicator in addition to a common pre-emption indicator associated with a resource set. This algorithm is described below in conjunction with the description of FIG. 11.

Figure 9:
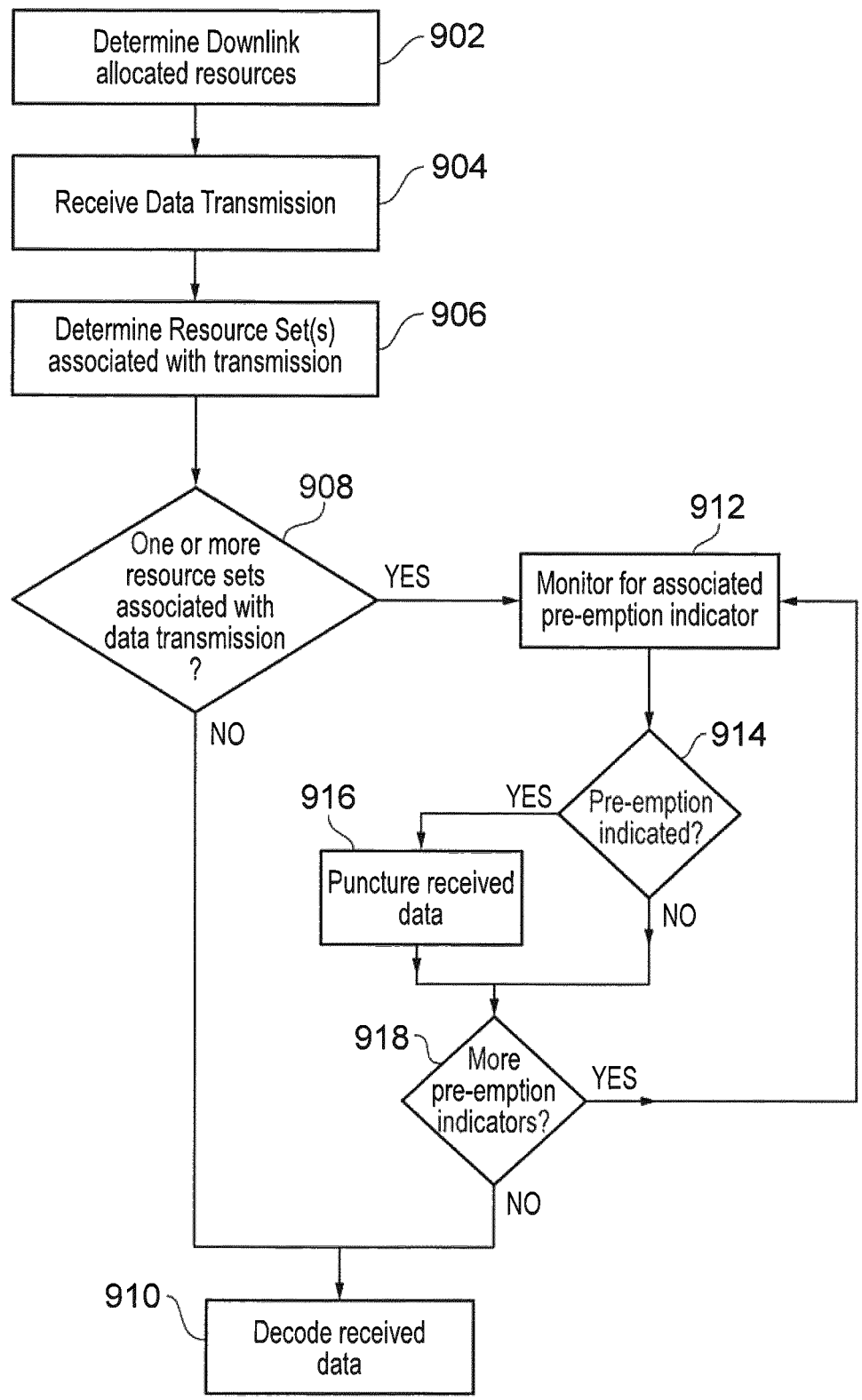
FIG. 9 is a flow diagram schematically representing a method of operating a terminal device in accordance with certain embodiments of the disclosure.

FIG. 9 is a flow chart that illustrates a process that may be carried out by the first device 200 of FIG. 1, in accordance with embodiments of the present disclosure. The process will be described with reference to the example shown in FIG. 3, although it will be readily appreciated that the process is not limited to such an arrangement.

The process starts at step 902 where the device determines that downlink resources 302 have been allocated for the transmission of an eMBB transmission.

The process then moves to step 904 in which the device receives the signals transmitted within the resources 302 allocated for the eMBB transmission.

At step 906 the device determines whether there one or more resource sets are associated with the resources 302 allocated for the eMBB transmission.

At step 908 the device evaluates whether one or more resource sets 308 are associated with the resources used for the eMBB data transmission 302. If no resource set is associated with a data transmission then control passes to step 910 and the device decodes the received data that was received within the allocated resources. In some embodiments, the device may in this case first decode a conventional (i.e. eMBB transmission-specific) pre-emption indicator prior to decoding the received data.

If at step 908 one or more resource sets are associated with the resources used for data transmission then the device monitors the pre-determined common pre-emption indicator transmission resources 306 during which a common pre-emption indicator may be transmitted associated with the resource set 308. In some embodiments, there may be multiple common pre-emption indicator transmission resources associated with the same resource set. The device 200 may determine which common pre-emption indicator transmission resources to monitor based on an indication transmitted in the DCI in which the eMBB resources 302 were allocated.

In some embodiments, the device may monitor only a single common pre-emption indicator transmission resource even though the allocated resources 302 may fall within multiple resource sets. In such embodiments, the device may select the nearest common pre-emption indicator transmission resources which follow the end of the eMBB resources 302. Alternatively, the device may select common pre-emption indicator transmission resources associated with the resource set in which the largest portion/majority of the resources 302 fall. This may result in the device monitoring common pre-emption indicator transmission resources which occur prior to the end of the eMBB resources 302.

In some embodiments, therefore, the device may not monitor common pre-emption indicator transmission resources which in fact indicate that pre-emption has occurred in respect of a portion of the eMBB resources 302.

At step 914 the device decodes the signals associated with the common pre-emption indicator transmission resources 306 and determines whether pre-emption has been indicated in respect of data received in step 914. If yes (as in FIG. 3), control passes to step 916 and appropriate processing of the data signals received in 904 is carried out. In some embodiments this may involve puncturing the received data or setting data symbols to zero. If at step 914 no pre-emption is indicated then control passes to step 918.

In step 918 the device determines whether more pre-emption indicators are associated with the resource set(s) 308 associated with the data transmission. If no then control passes to step 910. If, at step 918, more pre-emption indicators are identified then control passes back to 912 and the flow continues until all associated pre-emption indicators associated with the resources 302 on which the data transmission was received in step 904 have been received and decoded.

Once the full extent of any pre-emption is determined, the received eMBB data is decoded based on the determined extent of the pre-emption.

It will be clear that steps indicated in FIG. 9 may be performed in a different order and steps may be omitted depending on the exact configuration of the data resources and the resource sets and the associated pre-emption indicators.

Figure 10:
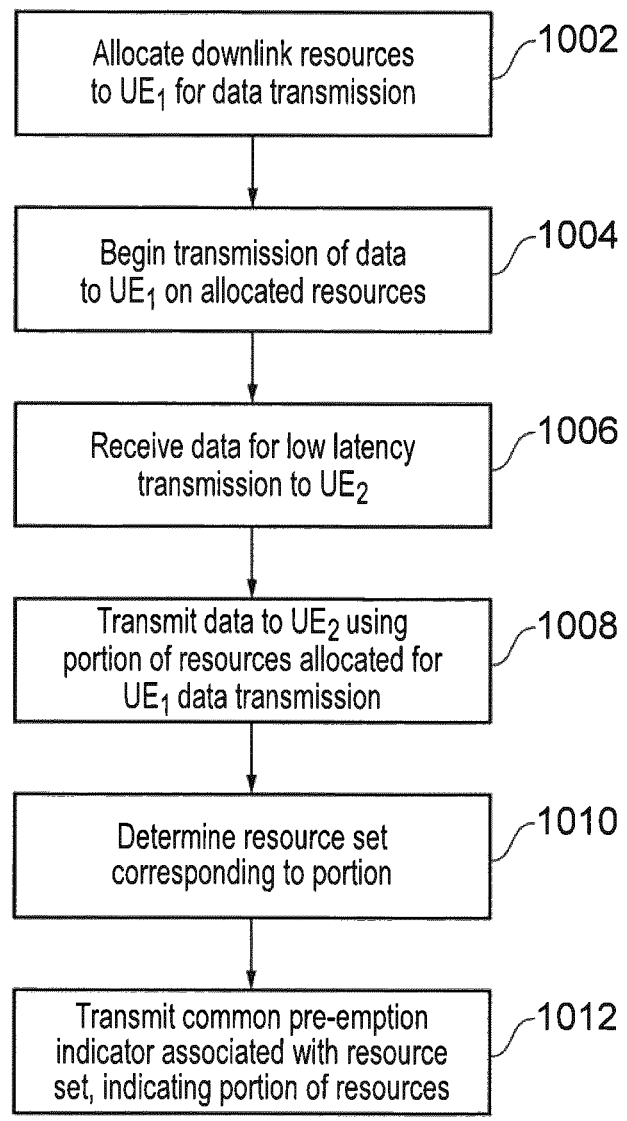
FIGS. 10 and 11 are flow diagrams schematically represent methods of operating network infrastructure equipment in accordance with certain embodiments of the disclosure.

FIG. 10 is a flow chart illustrating a process for operation by a base station such as the base station 102 of FIG. 1 transmitting eMBB data to the first device 200 and URLLC data to the second device 202. The process will be described with reference to the example arrangement shown in FIG. 3, although it will be readily appreciated that this is illustrative and that the process is not limited to such an arrangement.

The process starts at step 1002 in which the base station 102 allocates downlink resources to the first device 200 for data transmission of an eMBB transmission. Control then passes to step 1004 in which the controller 104 of the base station 102 is configured to control the transmitter 108 to transmit data associated with the eMBB transmission to the device 200 using the allocated resources 302.

In step 1006 the base station 102 receives, for example from the core network 100, data associated with a low latency requirement, which may be a URLLC data transmission, for transmission to the second device 202.

Control then passes to step 1008 in which the base station 102 transmits the low latency data to the second device using resources 304 which include at least a portion of the resources 302 which were allocated in step 1002 for the transmission of eMBB data to the first device 200. This constitutes a pre-emption event in which the pre-emption of eMBB data by URLLC data has occurred.

In step 1010 the base station determines one or more resource sets 308 corresponding to the portion of the eMBB data 302 which was pre-empted by the transmission of the URLLC data 304, that is to say, the portion of the resources which were allocated for the transmission of eMBB data to the first device 200 that were used for the transmission of URLLC data to the second device 202.

Having determined the resource set(s) associated with those resources, control passes to step 1012 in which the base station transmits a common pre-emption indicator associated with the resource set or sets identified in step 1010. The pre-emption indicator or indicators identify (explicitly or implicitly) resources including at least the portion of resources within the resource set during which pre-emption occurred.

Figure 11:
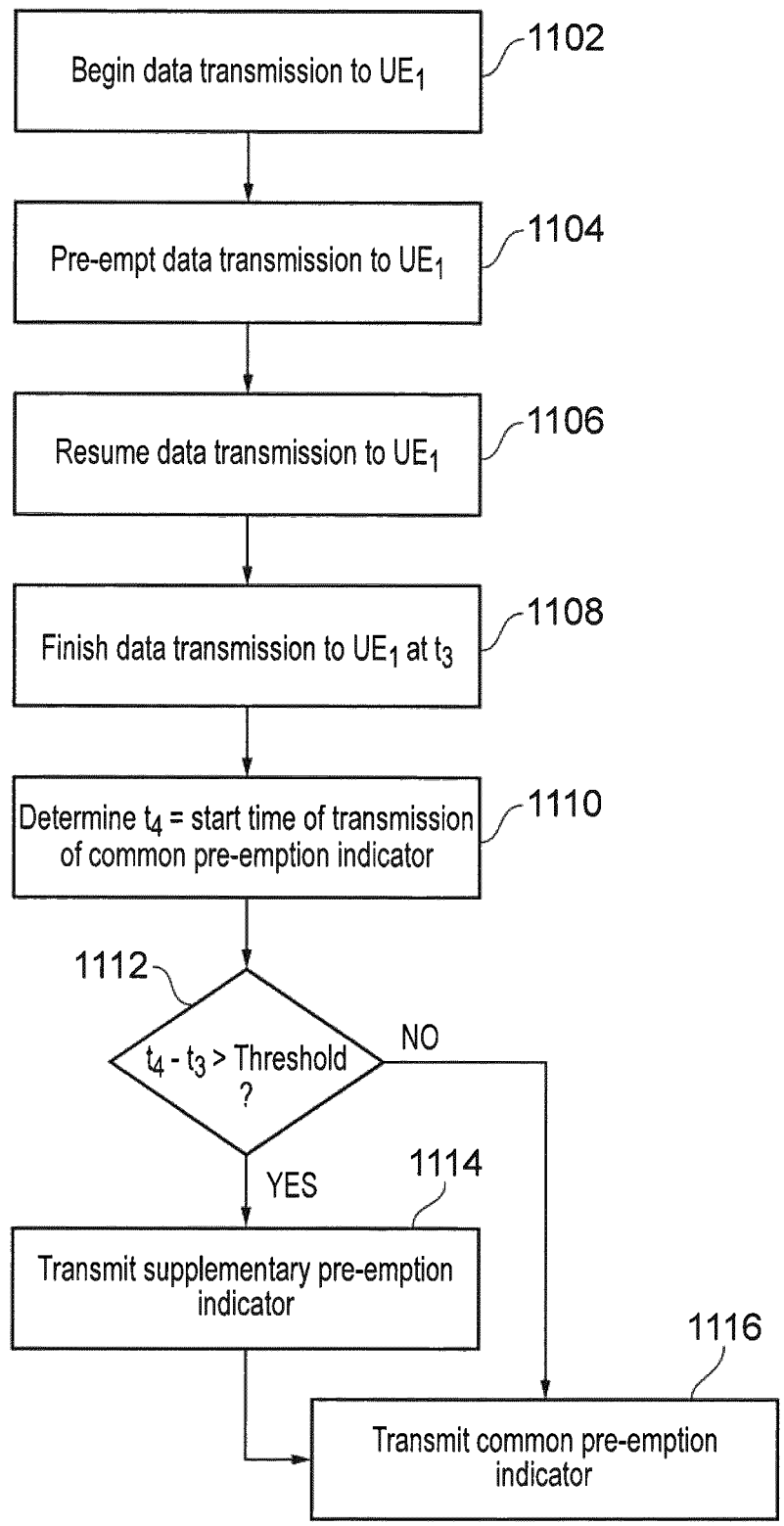

FIG. 11 illustrates a process performed by a network entity such as the base station 102 of FIG. 1 when transmitting eMBB data to the first device 200, by which the network determines whether to transmit a supplementary pre-emption indicator such as the supplementary pre-emption indicator 806 of FIG. 8.

The process starts at step 1102 in which the network begins the data transmission of an eMBB transmission to the first device 200. In step 1104 the network determines that it is necessary to pre-empt the data transmission initiated in step 1102 and to transmit URLLC data whose transmission uses at least a portion of the resources allocated for the transmission of the eMBB data in step 1102.

Following the transmission of the URLLC data the network continues in step 1106 to transmit the eMBB data to the device 200 if allocated resources remain after the transmission of the URLLC data. In some embodiments the network continues the transmission of the eMBB data in the remaining resources in the manner in which the transmission of the eMBB data would have occurred had pre-emption not occurred.

This eMBB transmission terminates in step 1108 at time t3 illustrated in FIG. 8.

In step 1110 the network identifies the resource set 802 associated with the pre-empted resources 808 and hence the resources 804 to be used for the transmission of a common pre-emption indicator which would indicate to the device 200 that the eMBB data transmission 808 which was initiated in step 1102 had been the subject of pre-emption.

It thus determines the time t4 which represents the start time of the transmission of the common pre-emption indicator in step 1110.

In step 1112 the network determines whether the duration between time t3 and time t4 exceeds a predetermined threshold. As described above, t3 and t4 represent, respectively, the time at which the eMBB transmission 808 which was subject to pre-emption terminated and the time at which the transmission of the common pre-emption indicator 804 would start.

If the duration exceeds a predetermined threshold, then control passes to step 1114 in which the network transmits a supplementary pre-emption indicator 806 indicating that the eMBB transmission 808 had been subject to pre-emption.

In some embodiments, other criteria may be used in addition to, or instead of the aforementioned criteria. In some embodiments as described above, the device may be configured to not monitor common pre-emption indicator transmission resources which in fact indicate that pre-emption has occurred in respect of a portion of the eMBB resources 302. A criteria for the network to determine to transmit the supplementary pre-emption indicator 806 may be based on whether the device will not monitor common pre-emption indicator transmission resources which in fact indicate that pre-emption has occurred in respect of a portion of the eMBB resources 302. For example, the network may determine to transmit the supplementary pre-emption indicator 806 if it determines that the device will be made aware of a pre-emption occurrence, for example, because the device is configured to not monitor common pre-emption indicator transmission resources which in fact indicate that pre-emption has occurred in respect of a portion of the eMBB resources.

The resources used for the transmission of the supplementary pre-emption indicator 806 may be determined with respect to the resources used for the eMBB transmission 808 to which it relates. The resources used for the transmission of the supplementary pre-emption indicator 806 may further be defined based on the resource set boundaries of the resource set 802 in which the pre-emption occurred.

If at step 1112 the time difference was determined not to exceed a threshold then the common pre-emption indicator is transmitted in step 1116.

In some embodiments step 1116 also follows step 1114, that is, the network may transmit the common pre-emption indicator 804 in any case regardless of whether or not a supplementary pre-emption indicator has been transmitted in respect of a pre-emption event.

In a further embodiment the network may determine that, having transmitted the supplementary pre-emption indicator 806, there is no additional benefit to be gained from transmitting the common pre-emption indicator 804 and therefore the network refrains from transmitting the common pre-emption indicator 804 if the pre-emption event occurring within a resource set has already been notified to the relevant device or devices by means of one or more supplementary pre-emption indicators.

Although the foregoing has described a number of specific example embodiments, the scope of the disclosure is not limited to these specific combinations of features. In particular, it will be clear to the skilled person that features described in respect of one or more example embodiments may be combined. For example, the possibility to transmit a supplementary pre-emption indicator described above in respect of FIGS. 8 and 11 may be combined with the resource set layout of any of FIGS. 3 to 7. Similarly, the location of common pre-emption indicator transmission resources 506 in FIG. 5 may be applied to the resource set arrangements of FIG. 3, 4, or 6 to 8. Options and alternatives described in relation to a particular embodiment may thus be applied in other embodiments.

Bandwidth Parts (BWP) are known to provide an allocation of a subset of an available system bandwidth to a UE. For example, 3GPP Release-15 introduced a BWP, which is a subset of the system bandwidth and a UE can be configured with one or multiple BWPs. An active BWP is the BWP that the UE is operating in and the active BWP can be changed by the network. Each UE can be configured with different BWP. It is known from [4] that the Pre-emption Resource Set is set to be the same as the UE BWP. Since the Pre-emption Resource Set is common to a group of UE whilst BWP is UE specific then it is possible that a UE with different BWP shares the same DCI but have different understanding of the Pre-emption Resource Set. That is this will lead to ghost pre-emption as described in [4] (R1-1718657).

Figure 12:
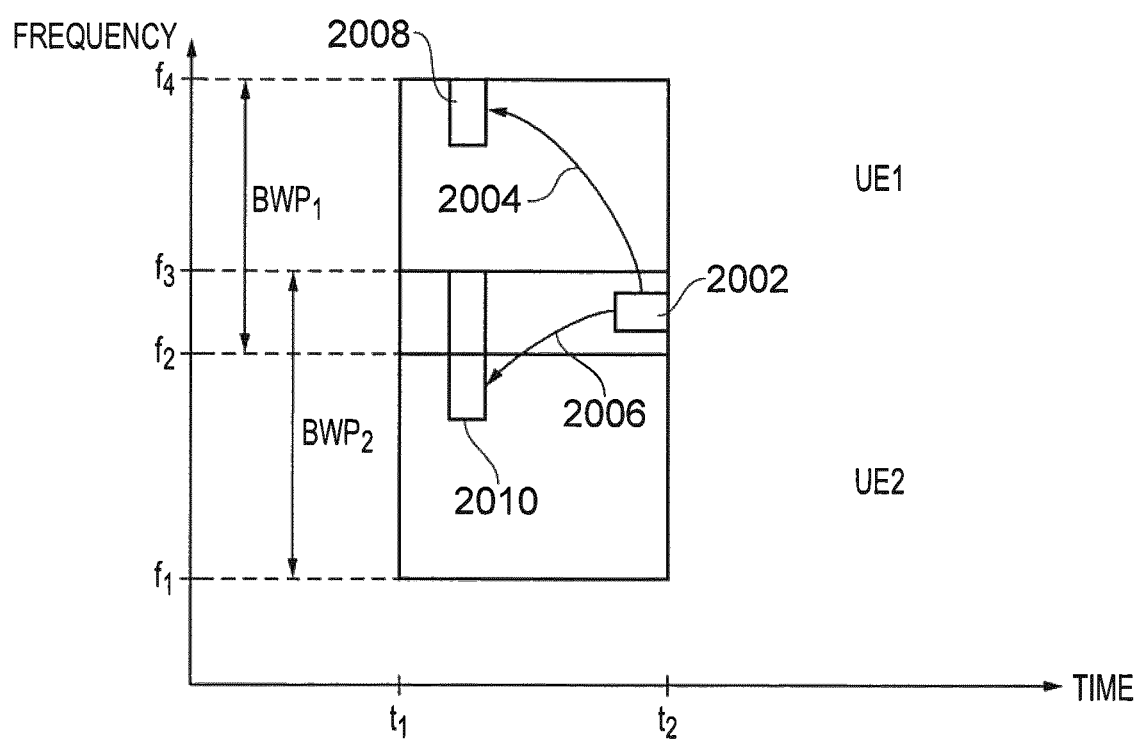
FIG. 12 is a schematic illustration of an example of ghost pre-emption indication in which a pre-emption indicated in a control channel which is common to more than one terminal device can be ambiguous and in correctly interpreted by one of the terminal devices.

An example of a ghost pre-emption indicator is provided in FIG. 12. FIG. 12 illustrates a configuration of bandwidth parts BWP1 for a first UE1 and BWP2 for a second UE2. BWP1 extends from a frequency f2 to a frequency f4 and is assigned to a first user equipment. BWP2 extends from a frequency f1 to a frequency f3 and is assigned to a second user equipment. BWP1 and BWP2 overlap from frequency f2 to frequency f3.

Conventionally, a UE considers that a pre-emption resource set is bounded by frequencies corresponding to its assigned bandwidth part. For example, the pre-emption indicator 2002 may be assumed by the first user equipment UE1 to correspond to a pre-emption resource set bounded by times t1 and t2, and by frequencies f2 and f4. The pre-emption indicator 2002 is assumed by the second user equipment UE2 to correspond to a pre-emption resource set bounded by times t1 and t2, and by frequencies f1 and f3. Accordingly, as illustrated by arrows 2004, 2006, the first user equipment UE1, the pre-emption indicator is interpreted as the set of resources 2008 within the BWP BWP1, whereas the second user equipment UE2 interprets the pre-emption indicator as the set of resources 2010 within the BWP BWP2.

Hence in some embodiments, in order for different UEs with a different BWP to share a common GC-DCI, then the following rule is required: UEs with different BWPs can share a GC-DCI carrying a pre-emption indicator only if the Pre-emption Resource Set identified by the GC-DCI is smaller than the overlapping region of the different BWPs which are common the UEs. An example is shown in FIG. 12.

Figure 13:
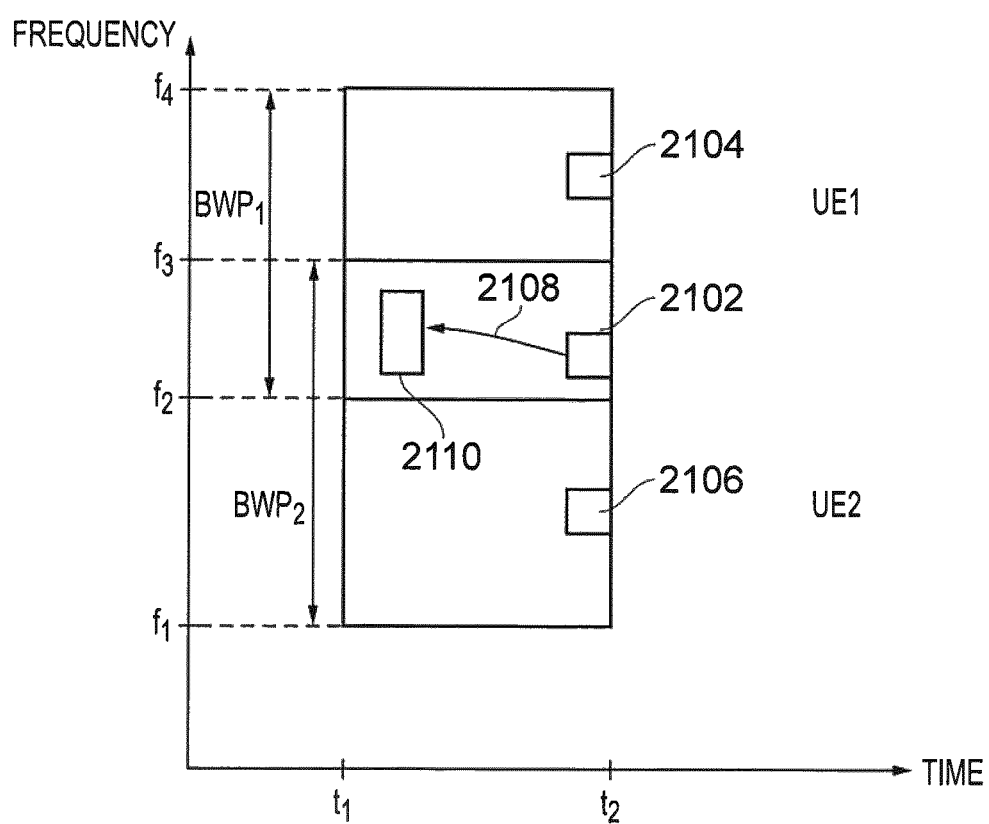
FIG. 13 is a schematic illustration of an example embodiment of the present technique in which an pre-emption indication is limited to signals transmitted to a different terminal device flow diagram representing an example embodiment.

FIG. 13 illustrates an arrangement according to an embodiment of the present technique. In FIG. 13, the pre-emption indicator 2102 corresponds to a pre-emption resource set bounded by times t1 and t2, and by frequencies f2 and f3, and so as illustrated by an arrow 2108 directs both UE1 and UE2 to the Pre-emption Resource Set 2110. As such, where UE1 is configured with BWP1 and UE2 is configured with BWP2, UE1 and UE2 can share a GC-DCI2 carrying the pre-emption indicator since the Pre-emption Resource Set 2 is within the overlapping region of BWP1 and BPW2. In other words the Pre-emption Resource Set cannot address regions outside of the UE's BWP.

In some embodiments, one or more additional pre-emption indicators may be configured. For example, pre-emption indicator 2104 may be configured to correspond to a pre-emption resource set bounded by times t1 and t2, and by frequencies f3 and f4. Similarly, pre-emption indicator 2106 may be configured to correspond to a pre-emption resource set bounded by times t1 and t2, and by frequencies f1 and f2.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely illustrative embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

In the present disclosure, method steps discussed herein may be carried out in any suitable order and not necessarily in the order in which they are listed. For example, steps may be carried out in an order which differs from an order used in the examples discussed above or from an indicative order used anywhere else for listing steps (e.g. in the claims), whenever possible or appropriate. Thus, in some cases, some steps may be carried out in a different order, or simultaneously (entirely or in part) or in the same order. So long as an order for carrying any of the steps of any method discussed herein is technically feasible, it is explicitly encompassed within the present disclosure.

As used herein, transmitting information or a message to an element may involve sending one or more messages to the element and may involve sending part of the information separately from the rest of the information. The number of "messages" involved may also vary depending on the layer or granularity considered. For example transmitting a message may involve using several resource elements in an LTE environment such that several signals at a lower layer correspond to a single message at a higher layer. Also, transmissions from one terminal to another may relate to the transmission of any one or more of user data, discovery information, control signalling and any other type of information to be transmitted.

Also, whenever an aspect is disclosed in respect of an apparatus or system, the teachings are also disclosed for the corresponding method. Likewise, whenever an aspect is disclosed in respect of a method, the teachings are also disclosed for any suitable corresponding apparatus or system. Additionally, it is also hereby explicitly disclosed that for any teachings relating to a method or a system where it has not been clearly specified which element or elements are configured to carry out a function or a step, any suitable element or elements that can carry out the function can be configured to carry out this function or step. For example any one or more of a mobile terminal, a base station or any other mobile unit may be configured accordingly if appropriate, so long as it is technically feasible and not explicitly excluded.

Whenever the expressions "greater than" or "smaller than" or equivalent are used herein, it is intended that they discloses both alternatives "and equal to" and "and not equal to" unless one alternative is expressly excluded or is not technically relevant.

It is noteworthy that even though the present disclosure has been discussed in the context of LTE and/or 5G, its teachings are applicable to but not limited to LTE, 5G or to other 3GPP standards. In particular, even though the terminology used herein is generally the same or similar to that of the 5G standards, the teachings are not limited to the present version of 5G and could apply equally to any appropriate arrangement not based on 5G and/or compliant with any other future version of an 5G or 3GPP or other standard.

Respective features of the present disclosure are defined by the following numbered paragraphs:

Paragraph 1. A method of receiving data by a terminal device, comprising:
  determining an allocation of downlink resources of a wireless radio interface for the reception of data by the terminal device,
  receiving signals representing the data within the allocated downlink resources, wherein the receiving includes:
  determining that the allocated downlink resources include at least a portion of a first predetermined resource set,
  receiving via the wireless radio interface, signals within first predetermined common pre-emption indicator transmission resources allocated for the transmission of a first pre-emption indicator associated with the first predetermined resource set, and
  determining, based on the signals received within the first predetermined common pre-emption indicator transmission resources, whether a portion of the signals received within the allocated downlink resources and within the first predetermined resource set comprises data signals transmitted to a different terminal device.

Paragraph 2. A method according to paragraph 1, wherein the signals received within the first common pre-emption indicator transmission resources comprise a common pre-emption indicator and
  the common pre-emption indicator identifies a set of resources within the first predetermined resource set, the identified set of resources including at least a portion of the resources within the first predetermined resource set allocated for the downlink transmission of data to the terminal device in which data was transmitted to the different terminal device.

Paragraph 3. A method according to paragraphs 1 or 2, wherein the signals received within the first predetermined common pre-emption indicator transmission resources comprise a common pre-emption indicator and
  the common pre-emption indicator identifies a set of resources used for the transmission of the data signals to the different terminal device.

Paragraph 4. A method according to paragraph 2, comprising
  decoding the data from the received signals representing the data, wherein in decoding the data, the terminal device ignores signals received during the set of resources identified by the common pre-emption indicator.

Paragraph 5. A method according to paragraphs 1 to 4, wherein the first common pre-emption indicator transmission resources allocated for the transmission of a pre-emption indicator associated with the first predetermined resource set is a portion of the first predetermined resource set.

Paragraph 6. A method according to paragraphs 1 to 5, wherein the first predetermined common pre-emption indicator transmission resources are within a first bandwidth part allocated to the terminal device and within a second bandwidth part allocated to a second terminal device, and the portion of the signals received within the allocated downlink resources comprising data signals transmitted to a different terminal device are within the first bandwidth part and the second bandwidth part.

Paragraph 7. A method according to paragraphs 1 to 6, wherein the first bandwidth portion is divided into a plurality of predetermined resource sets one of which is the first predetermined resource set and each predetermined resource set is associated with separate common pre-emption indicator transmission resources.

Paragraph 8. A method according to paragraphs 1 to 7, wherein
  the end of the first predetermined set of downlink resources allocated for the transmission of a pre-emption indicator associated with the first predetermined resource set occurs contemporaneously with or after the end of the first predetermined resource set.

Paragraph 9. A method according to paragraphs 1 to 8, wherein
  the first common pre-emption indicator transmission resources allocated for the transmission of a pre-emption indicator associated with the first predetermined resource set is outside of the first predetermined resource set Paragraph 10. A method according to paragraphs 1 to 9, comprising:
  determining that a second predetermined resource set includes at least a portion of the allocated downlink resources,
  receiving signals within a second predetermined set of downlink resources allocated for the transmission of a second pre-emption indicator associated with the second predetermined resource set, and
  determining, based on the signals received within the second predetermined set of downlink resources, whether a portion of the signals received within the allocated downlink resources and within the second predetermined resource set comprises data signals transmitted to the different terminal device.

Paragraph 11. A method according to paragraphs 1 to 10, wherein the second predetermined resource set comprises a portion of the first predetermined resource set.

Paragraph 12. A method according to paragraphs 1 to 11, wherein all of the allocated downlink resources occur within the first predetermined resource set.

Paragraph 13. A method according to paragraphs 1 to 12, comprising receiving signalling information from the network, the signalling information defining at least one of the first predetermined resource set and the first predetermined common pre-emption indicator transmission resources allocated for the transmission of the first pre-emption indicator associated with the first predetermined resource set.

Paragraph 14. A method according to paragraphs 1 to 13, comprising receiving via the wireless radio interface, signals within downlink resources allocated for the transmission of a supplementary pre-emption indicator, the supplementary pre-emption indicator associated with the allocated downlink resources for the reception of data by the terminal device, and determining, based on the signals received within the downlink resources allocated for the transmission of a supplementary pre-emption indicator, whether a portion of the signals received within the allocated downlink resources comprises data signals transmitted to a different terminal device.

Paragraph 15. A method according to paragraphs 1 to 14, wherein the first predetermined resource set is characterized by a contiguous range of predetermined frequencies between a first frequency and a second frequency for a predetermined time period between a first resource set starting time and a first resource set ending time.

Paragraph 16. A method according to paragraphs 1 to 15, comprising:

receiving via the wireless radio interface signalling information indicating at least one of the first frequency, the second frequency, the first resource set starting time and the first resource set ending time.

Paragraph 17. A method according to paragraphs 1 to 15, comprising:

determining at least one of the first frequency, the second frequency, the first resource set starting time and the first resource set ending time based on the first predetermined common pre-emption indicator transmission resources.

Paragraph 18. A method according to paragraphs 1 to 17, wherein:

the first frequency is offset from a lower frequency edge of the first predetermined common pre-emption indicator transmission resources by a first predetermined frequency offset and the first resource set start time is determined based on the start time of the first predetermined common pre-emption indicator transmission resources and a predetermined time offset.

Paragraph 19. A method of receiving data by a terminal device, comprising:

determining an allocation of downlink resources of a wireless radio interface for the reception of data by the terminal device, receiving signals representing the data within the allocated downlink resources, wherein the receiving includes:

determining that the allocated downlink resources include at least a portion of a predetermined resource set, determining that a time duration between an end of the allocated downlink resources and a start oft predetermined common pre-emption indicator transmission resources allocated for the transmission of a pre-emption indicator associated with the predetermined resource set exceeds a threshold, responsive to the determining, receiving via the wireless radio interface signals within a set of downlink resources allocated for a transmission of a supplementary pre-emption indicator associated with the allocated downlink resources and determining, based on the signals received within the set of downlink resources allocated for the transmission of the supplementary pre-emption indicator associated with the allocated downlink resources, whether a portion of the signals received within the allocated downlink resources comprises data signals transmitted to a different terminal device.

Paragraph 20. A method of transmitting first data to a first terminal device, comprising:

allocating a set of downlink resources of a wireless radio interface for the transmission of the first data to the first terminal device, transmitting second data to a second terminal device, using downlink resources comprising at least a portion of the set of downlink resources allocated for the transmission of the first data to the first terminal device, determining that the portion of the set of downlink resources allocated for the transmission of the first data to the first terminal device that is used for transmitting the second data to the second terminal device includes at least a part of a first resource set, and transmitting a first pre-emption indicator associated with the first resource set, the first pre-emption indicator identifying a set of resources within the first resource set, the identified set of resources including at least the portion of the set of downlink resources allocated for the transmission of the first data to the first terminal device used for transmitting the second data to the second terminal device.

Paragraph 21. A method according to paragraph 20, wherein the first pre-emption indicator associated with the first resource set is transmitted using a portion of the first resource set.

Paragraph 22. A method according to paragraphs 20 or 21, wherein the first pre-emption indicator associated with the first resource set is transmitted using resources outside of the first resource set.

Paragraph 23. A method according to paragraphs 20, 21 or 22, wherein the end of the transmission of the first pre-emption indicator occurs contemporaneously with or after the end of the first resource set.

Paragraph 24. A method according to paragraphs 20 to 23, comprising receiving the second data for transmission to the second terminal device, wherein the second data for transmission to the second terminal device is associated with a low latency requirement requiring the second data to be transmitted to the second terminal device before the end of the resources allocated for the transmission of the first data to the first terminal device.

Paragraph 25. A method according to paragraphs 20 to 24, comprising determining that the portion of the set of downlink resources allocated for the transmission of the first data to the first terminal device that is used for the transmitting of the second data to the second terminal device includes at least a part of a second resource set, and transmitting a second pre-emption indicator associated with the second resource set, the second pre-emption indicator identifying a set of resources within the second resource set, the identified set of resources including at least the portion of the set of downlink resources allocated for the transmission of data to the first terminal device used for transmitting data to the second terminal device.

Paragraph 26. A method according to paragraphs 20 to 25, comprising transmitting signalling information, the signalling information defining at least one of the first predetermined resource set and a predetermined set of downlink resources allocated for the transmission of the first pre-emption indicator associated with the first resource set.

Paragraph 27. A method according to paragraphs 20 to 26, comprising transmitting a third pre-emption indicator, the third pre-emption indicator associated with the allocated downlink resources for the transmission of the first data to the first terminal device, wherein the third pre-emption indicator identifies the portion of the set of downlink resources allocated for the transmission of the first data to the first terminal device used for transmitting the second data to the second terminal device.

Paragraph 28. A method according to paragraphs 20 to 27, wherein a predetermined resource set is characterized by a contiguous range of predetermined frequencies between a first frequency and a second frequency for a predetermined time period between a resource set starting time and a resource set ending time.

Paragraph 29. A method of transmitting first data to a first terminal device, comprising:

allocating a set of downlink resources of a wireless radio interface for the transmission of the first data to the first terminal device, transmitting second data to a second terminal device, using downlink resources comprising at least a portion of the set of downlink resources allocated for the transmission of the first data to the first terminal device, determining that the portion of the set of downlink resources allocated for the transmission of the first data to the first terminal device that is used for transmitting the second data to the second terminal device includes at least a part of a predetermined resource set, determining that a time duration between an end of the allocated downlink resources and a start of predetermined common pre-emption indicator transmission resources allocated for the transmission of a first pre-emption indicator associated with the predetermined resource set exceeds a threshold, and responsive to the determining, transmitting a second pre-emption indicator, the second pre-emption indicator associated with the allocated downlink resources for the transmission of the first data to the first terminal device, wherein the second pre-emption indicator identifies the portion of the set of downlink resources allocated for the transmission of the first data to the first terminal device that is used for transmitting the second data to the second terminal device.

Paragraph 30. A terminal device for receiving data, comprising:

receiver circuitry and control circuitry, wherein the control circuitry is configured to determine an allocation of downlink resources of a wireless radio interface for the reception of data by the terminal device, to control the receiver circuitry to receive signals representing the data within the allocated downlink resources, to determine that the allocated downlink resources include at least a portion of a first predetermined resource set, to control the receiver circuitry to receive via the wireless radio interface, signals within first predetermined common pre-emption indicator transmission resources allocated for the transmission of a first pre-emption indicator associated with the first predetermined resource set, and to determine, based on the signals received within the first predetermined common pre-emption indicator transmission resources, whether a portion of the signals received within the allocated downlink resources and within the first predetermined resource set comprises data signals transmitted to a different terminal device.

Paragraph 31. A terminal device according to paragraph 30, wherein the signals received within the first common pre-emption indicator transmission resources comprise a common pre-emption indicator and the common pre-emption indicator identifies a set of resources within the first predetermined resource set, the identified set of resources including at least a portion of the resources within the first predetermined resource set allocated for the downlink transmission of data to the terminal device in which data was transmitted to the different terminal device.

Paragraph 32. A terminal device according to paragraphs 30 or 31, wherein the signals received within the first predetermined common pre-emption indicator transmission resources comprise a common pre-emption indicator and the common pre-emption indicator identifies a set of resources used for the transmission of the data signals to the different terminal device.

Paragraph 33. A terminal device according to paragraphs 30, 31 or 32, wherein the controller circuitry is configured to decode the data from the received signals representing the data, wherein in decoding the data, the controller circuitry ignores signals received during the set of resources identified by the common pre-emption indicator.

Paragraph 34. A terminal device according to paragraphs 30 to 33, wherein the first common pre-emption indicator transmission resources allocated for the transmission of a pre-emption indicator associated with the first predetermined resource set is a portion of the first predetermined resource set.

Paragraph 35. A terminal device according to paragraphs 30 to 34, wherein the first predetermined common pre-emption indicator transmission resources are within a first bandwidth part allocated to the terminal device and within a second bandwidth part allocated to a second terminal device, and the portion of the signals received within the allocated downlink resources comprising data signals transmitted to a different terminal device are commonly within the first bandwidth part and the second bandwidth part.

Paragraph 36. A terminal device according to paragraphs 30 to 35, wherein the first bandwidth portion is divided into a plurality of predetermined resource sets one of which is the first predetermined resource set and each predetermined resource set is associated with separate common pre-emption indicator transmission resources.

Paragraph 37. A terminal device according to paragraphs 30 to 36, wherein the end of the first predetermined set of downlink resources allocated for the transmission of a pre-emption indicator associated with the first predetermined resource set occurs contemporaneously with or after the end of the first predetermined resource set.

Paragraph 38. A terminal device according to paragraphs 30 to 37, wherein
the first common pre-emption indicator transmission resources allocated for the transmission of a pre-emption indicator associated with the first predetermined resource set is outside of the first predetermined resource set Paragraph 39. A terminal device according to paragraphs 30 to 38, wherein the controller circuitry is configured to determine that a second predetermined resource set includes at least a portion of the allocated downlink resources,
to control the receiver circuitry to receive signals within a second predetermined set of downlink resources allocated for the transmission of a second pre-emption indicator associated with the second predetermined resource set, and
to determine, based on the signals received within the second predetermined set of downlink resources, whether a portion of the signals received within the allocated downlink resources and within the second predetermined resource set comprises data signals transmitted to the different terminal device.

Paragraph 40. A terminal device according to paragraphs 30 to 39, wherein the second predetermined resource set comprises a portion of the first predetermined resource set Paragraph 41. A terminal device according to paragraphs 30 to 40, wherein all of the allocated downlink resources occur within the first predetermined resource set.

Paragraph 42. A terminal device according to paragraphs 30 to 41, wherein the controller circuitry is configured to control the receiver circuitry to receive signalling information from the network, the signalling information defining at least one of the first predetermined resource set and the first predetermined common pre-emption indicator transmission resources allocated for the transmission of the first pre-emption indicator associated with the first predetermined resource set.

Paragraph 43. A terminal device according to paragraphs 30 to 42, wherein the controller circuitry is configured to control the receiver circuitry to receive via the wireless radio interface, signals within downlink resources allocated for the transmission of a supplementary pre-emption indicator, the supplementary pre-emption indicator associated with the allocated downlink resources for the reception of data by the terminal device, and
the controller circuitry is configured to determine, based on the signals received within the downlink resources allocated for the transmission of a supplementary pre-emption indicator, whether a portion of the signals received within the allocated downlink resources comprises data signals transmitted to a different terminal device.

Paragraph 44. A terminal device according to paragraphs 30 to 43, wherein
the first predetermined resource set is characterized by a contiguous range of predetermined frequencies between a first frequency and a second frequency for a predetermined time period between a first resource set starting time and a first resource set ending time.

Paragraph 45. A terminal device according to paragraphs 30 to 44, wherein the controller circuitry is configured to control the receiver circuitry to receive via the wireless radio interface signalling information indicating at least one of the first frequency the second frequency, the first resource set starting time and the first resource set ending time.

Paragraph 46. A terminal device according to paragraphs 30 to 45, wherein the controller circuitry is configured to determine at least one of the first frequency, the second frequency, the first resource set starting time and the first resource set ending time based on the first predetermined common pre-emption indicator transmission resources.

Paragraph 47. A terminal device according to paragraphs 30 to 46, wherein the first frequency is offset from a lower frequency edge of the first predetermined common pre-emption indicator transmission resources by a first predetermined frequency offset and the first resource set start time is determined based on the start time of the first predetermined common pre-emption indicator transmission resources and a predetermined time offset.

Paragraph 48. A terminal device for receiving data, comprising:
receiver circuitry and control circuitry, wherein the control circuitry is configured to determine an allocation of downlink resources of a wireless radio interface for the reception of data by the terminal device,
to control the receiver circuitry to receive signals representing the data within the allocated downlink resources, wherein the receiving includes:
to determine that the allocated downlink resources include at least a portion of a first predetermined resource set,
to determine that a time duration between an end of the allocated downlink resources and a start of predetermined common pre-emption indicator transmission resources allocated for the transmission of a first pre-emption indicator associated with the first predetermined resource set exceeds a threshold,
responsive to the determining, to control the receiver circuitry to receive via the wireless radio interface signals within a set of downlink resources allocated for a transmission of a supplementary pre-emption indicator associated with the allocated resources and
determining, based on the signals received within the set of downlink resources allocated for the transmission of the supplementary pre-emption indicator associated with the allocated resources, whether a portion of the signals received within the allocated downlink resources comprises data signals transmitted to a different terminal device.

Paragraph 49. An infrastructure equipment for forming part of a radio network part of a wireless communications network, the infrastructure equipment comprising
transmitter circuitry configured to transmit radio signals via a wireless access interface formed by the infrastructure equipment to one or more terminal devices,
receiver circuitry configured to receive radio signals transmitted from the one or more terminal devices via the wireless access interface, and
controller circuitry configured to control the transmitter circuitry and the receiver circuitry to transmit data carried by the radio signals to the one or more terminal devices and to receive data carried by the radio signals from the one or more terminal devices, the controller circuitry being configured with the receiver circuitry
to allocate a set of downlink resources of a wireless radio interface for the transmission of the first data to the first terminal device,
to transmit second data to a second terminal device, using downlink resources comprising at least a portion of the set of downlink resources allocated for the transmission of the first data to the first terminal device,
to determine that the portion of the set of downlink resources allocated for the transmission of the first data to the first terminal device that is used for transmitting the second data to the second terminal device includes at least a part of a first resource set, and
to transmit a first pre-emption indicator associated with the first resource set, the first pre-emption indicator identifying a set of resources within the first resource set, the identified set of resources including at least the portion of the set of downlink resources allocated for the transmission of the first data to the first terminal device used for transmitting the second data to the second terminal device.

Paragraph 50. An infrastructure equipment according to paragraph 49, wherein
the first pre-emption indicator associated with the first resource set is transmitted using a portion of the first resource set.

Paragraph 51. An infrastructure equipment according to paragraph 49, wherein the first pre-emption indicator associated with the first resource set is transmitted using resources outside of the first resource set.

Paragraph 52. An infrastructure equipment according to paragraph 49, wherein
the end of the transmission of the first pre-emption indicator occurs contemporaneously with or after the end of the first resource set.

Paragraph 53. An infrastructure equipment according to paragraph 49, comprising
receiving the second data for transmission to the second terminal device, wherein
the second data for transmission to the second terminal device is associated with a low latency requirement requiring the second data to be transmitted to the second terminal device before the end of the resources allocated for the transmission of the first data to the first terminal device.

Paragraph 54. An infrastructure equipment according to paragraph 49, comprising
determining that the portion of the set of downlink resources allocated for the transmission of the first data to the first terminal device that is used for the transmitting of the second data to the second terminal device includes at least a part of a second resource set,
transmitting a second pre-emption indicator associated with the second resource set, the second pre-emption indicator identifying a set of resources within the second resource set, the identified set of resources including at least the portion of the set of downlink resources allocated for the transmission of data to the first terminal device used for transmitting data to the second terminal device.

Paragraph 55. An infrastructure equipment according to paragraph 49, comprising
transmitting signalling information, the signalling information defining at least one of the first predetermined resource set and a predetermined set of downlink resources allocated for the transmission of the first pre-emption indicator associated with the first resource set.

Paragraph 56. An infrastructure equipment according to paragraph 49, comprising
transmitting a third pre-emption indicator, the third pre-emption indicator associated with the allocated downlink resources for the transmission of the first data to the first terminal device,
wherein the third pre-emption indicator identifies the portion of the set of downlink resources allocated for the transmission of the first data to the first terminal device used for transmitting the second data to the second terminal device.

Paragraph 57. An infrastructure equipment according to paragraph 49, wherein
a predetermined resource set is characterized by a contiguous range of predetermined frequencies between a first frequency and a second frequency for a predetermined time period between a resource set starting time and a resource set ending time.

Paragraph 58. An infrastructure equipment according to paragraph 49, wherein
the portion of the signals received within the allocated downlink resources comprising data signals transmitted to a different terminal device are within the first bandwidth part and the second bandwidth part.

Paragraph 59. An infrastructure equipment according to paragraph 58, wherein the first bandwidth portion is divided into a plurality of predetermined resource sets one of which is the first predetermined resource set and each predetermined resource set is associated with separate common pre-emption indicator transmission resources.

Paragraph 60. An infrastructure equipment for forming part of a radio network part of a wireless communications network, the infrastructure equipment comprising
transmitter circuitry configured to transmit radio signals via a wireless access interface formed by the infrastructure equipment to one or more terminal devices,
receiver circuitry configured to receive radio signals transmitted from the one or more terminal devices via the wireless access interface, and
controller circuitry configured to control the transmitter circuitry and the receiver circuitry to transmit data carried by the radio signals to the one or more terminal devices and to receive data carried by the radio signals from the one or more terminal devices, the controller circuitry being configured with the receiver circuitry
to allocate a set of downlink resources of a wireless radio interface for the transmission of the first data to the first terminal device,
to transmit second data to a second terminal device, using downlink resources comprising at least a portion of the set of downlink resources allocated for the transmission of the first data to the first terminal device,
to determine that the portion of the set of downlink resources allocated for the transmission of the first data to the first terminal device that is used for transmitting the second data to the second terminal device includes at least a part of a first resource set,
to determine that a time duration between an end of the allocated downlink resources and a start of a first predetermined set of downlink resources allocated for the transmission of a first pre-emption indicator associated with the first predetermined resource set exceeds a threshold, and
responsive to the determining, to transmit a second pre-emption indicator, the second pre-emption indicator associated with the allocated downlink resources for the transmission of the first data to the first terminal device,
wherein the second pre-emption indicator identifies the portion of the set of downlink resources allocated for the transmission of the first data to the first terminal device that is used for transmitting the second data to the second terminal device.

Paragraph 61. Circuitry for a terminal device for receiving data, the terminal device comprising:
receiver circuitry and control circuitry, wherein the control circuitry is configured to determine an allocation of downlink resources of a wireless radio interface for the reception of data by the terminal device,
to control the receiver circuitry to receive signals representing the data within the allocated downlink resources,
to determine that the allocated downlink resources include at least a portion of a first predetermined resource set,
to control the receiver circuitry to receive via the wireless radio interface, signals within first predetermined common pre-emption indicator transmission resources allocated for the transmission of a first pre-emption indicator associated with the first predetermined resource set, and to determine, based on the signals received within the first predetermined common pre-emption indicator transmission resources, whether a portion of the signals received within the allocated downlink resources and within the first predetermined resource set comprises data signals transmitted to a different terminal device.

Paragraph 62. Circuitry for an infrastructure equipment for forming part of a radio network part of a wireless communications network, the infrastructure equipment comprising transmitter circuitry configured to transmit radio signals via a wireless access interface formed by the infrastructure equipment to one or more terminal devices, receiver circuitry configured to receive radio signals transmitted from the one or more terminal devices via the wireless access interface, and controller circuitry configured to control the transmitter circuitry and the receiver circuitry to transmit data carried by the radio signals to the one or more terminal devices and to receive data carried by the radio signals from the one or more terminal devices, the controller circuitry being configured with the receiver circuitry to allocate a set of downlink resources of a wireless radio interface for the transmission of the first data to the first terminal device, to transmit second data to a second terminal device, using downlink resources comprising at least a portion of the set of downlink resources allocated for the transmission of the first data to the first terminal device, to determine that the portion of the set of downlink resources allocated for the transmission of the first data to the first terminal device that is used for transmitting the second data to the second terminal device includes at least a part of a first resource set, and to transmit a first pre-emption indicator associated with the first resource set, the first pre-emption indicator identifying a set of resources within the first resource set, the identified set of resources including at least the portion of the set of downlink resources allocated for the transmission of the first data to the first terminal device used for transmitting the second data to the second terminal device.

Paragraph 63. A computer program product comprising computer readable instructions which, when loaded onto a computer, configure the computer to perform a method according to any one of paragraphs 1, 18, 20, or 29.

Paragraph 64. A method of receiving data by a terminal device, comprising:

determining an allocation of downlink resources of a wireless radio interface for the reception of data by the terminal device, receiving signals representing the data within the allocated downlink resources, wherein the receiving includes:

determining that the allocated downlink resources include at least a portion of a first predetermined resource set, receiving via the wireless radio interface, signals within first predetermined common pre-emption indicator transmission resources allocated for the transmission of a first pre-emption indicator associated with the first predetermined resource set, and determining, based on the signals received within the first predetermined common pre-emption indicator transmission resources, whether a portion of the signals received within the allocated downlink resources and within the first predetermined resource set comprises data signals transmitted to a different terminal device, wherein the first predetermined common pre-emption indicator transmission resources are within a first bandwidth part allocated to the terminal device and within a second bandwidth part allocated to a second terminal device, and the portion of the signals received within the allocated downlink resources comprising data signals transmitted to a different terminal device are within the first bandwidth part and the second bandwidth part.

Paragraph 65. A method according to paragraph 64, wherein the first bandwidth portion is divided into a plurality of predetermined resource sets one of which is the first predetermined resource set and each predetermined resource set is associated with separate common pre-emption indicator transmission resources.

Paragraph 66. A terminal device for receiving data, comprising:

receiver circuitry and control circuitry, wherein the control circuitry is configured to determine an allocation of downlink resources of a wireless radio interface for the reception of data by the terminal device, to control the receiver circuitry to receive signals representing the data within the allocated downlink resources, to determine that the allocated downlink resources include at least a portion of a first predetermined resource set, to control the receiver circuitry to receive via the wireless radio interface, signals within first predetermined common pre-emption indicator transmission resources allocated for the transmission of a first pre-emption indicator associated with the first predetermined resource set, and to determine, based on the signals received within the first predetermined common pre-emption indicator transmission resources, whether a portion of the signals received within the allocated downlink resources and within the first predetermined resource set comprises data signals transmitted to a different terminal device, wherein the first predetermined common pre-emption indicator transmission resources are within a first bandwidth part allocated to the terminal device and within a second bandwidth part allocated to a second terminal device, and the portion of the signals received within the allocated downlink resources comprising data signals transmitted to a different terminal device are commonly within the first bandwidth part and the second bandwidth part.

Paragraph 67. A terminal device according to paragraph 66, wherein the first bandwidth portion is divided into a plurality of predetermined resource sets one of which is the first predetermined resource set and each predetermined resource set is associated with separate common pre-emption indicator transmission resources.

Paragraph 68. An infrastructure equipment for forming part of a radio network part of a wireless communications network, the infrastructure equipment comprising transmitter circuitry configured to transmit radio signals via a wireless access interface formed by the infrastructure equipment to one or more terminal devices, receiver circuitry configured to receive radio signals transmitted from the one or more terminal devices via the wireless access interface, and controller circuitry configured to control the transmitter circuitry and the receiver circuitry to transmit data carried by the radio signals to the one or more terminal devices and to receive data carried by the radio signals from the one or more terminal devices, the controller circuitry being configured with the receiver circuitry to allocate a set of downlink resources of a wireless radio interface for the transmission of the first data to the first terminal device, to transmit second data to a second terminal device, using downlink resources comprising at least a portion of the set of downlink resources allocated for the transmission of the first data to the first terminal device,
to determine that the portion of the set of downlink resources allocated for the transmission of the first data to the first terminal device that is used for transmitting the second data to the second terminal device includes at least a part of a first resource set, and
to transmit a first pre-emption indicator associated with the first resource set, the first pre-emption indicator identifying a set of resources within the first resource set, the identified set of resources including at least the portion of the set of downlink resources allocated for the transmission of the first data to the first terminal device used for transmitting the second data to the second terminal device wherein the first predetermined common pre-emption indicator transmission resources are within a first bandwidth part allocated to the terminal device and within a second bandwidth part allocated to a second terminal device, and the portion of the signals received within the allocated downlink resources comprising data signals transmitted to a different terminal device are within the first bandwidth part and the second bandwidth part.

Paragraph 69. An infrastructure equipment according to paragraph 68, wherein the first bandwidth portion is divided into a plurality of predetermined resource sets one of which is the first predetermined resource set and each predetermined resource set is associated with separate common pre-emption indicator transmission resources.

REFERENCES

[1] RP-160671, "New SID Proposal: Study on New Radio Access Technology," NTT DOCOMO, RAN #71
[2] RP-170847, "New WID on New Radio Access Technology," NTT DOCOMO, INC., RAN #75
[3] Holma H. and Toskala A, "LTE for UMTS OFDMA and SC-FDMA based radio access", John Wiley and Sons, 2009

The invention claimed is:

1. A terminal device for receiving data, comprising:
receiver circuitry and control circuitry, wherein the control circuitry is configured to:
determine an allocation of downlink resources of a wireless radio interface for reception of data by the terminal device;
control the receiver circuitry to receive signals representing data within the allocated downlink resources;
determine that the allocated downlink resources include at least a portion of a first predetermined resource set, wherein the first predetermined resource set is characterized by a contiguous range of predetermined frequencies between a first frequency and a second frequency for a predetermined time period between a first resource set starting time and a first resource set ending time;
control the receiver circuitry to receive, via the wireless radio interface, signals within first predetermined common preemption indicator transmission resources allocated for a transmission of a first preemption indicator associated with the first predetermined resource set, wherein the first preemption indicator is configured through radio resource control (RRC), wherein the signals received within the first predetermined common preemption indicator transmission resources comprise a common preemption indicator and the common preemption indicator identifies a set of resources within the first predetermined resource set, the identified set of resources including at least a portion of the resources within the first predetermined resource set allocated for the downlink transmission of data to the terminal device in which data was transmitted to a different terminal device;
determine, based on the signals received within the first predetermined common preemption indicator transmission resources, whether a portion of the signals received within the allocated downlink resources and within the first predetermined resource set comprises data signals transmitted to a different terminal device, wherein the portion of the signals are determined based on a first parameter in a time domain and a second parameter in a frequency domain; and
determine the first frequency, the second frequency, the first resource set starting time and the first resource set ending time based on the first predetermined common preemption indicator transmission resources,
wherein the first frequency is determined based on a predetermined frequency offset and the first resource set start time is determined based on a predetermined time offset after receiving the common preemption indicator within the first predetermined common preemption indicator transmission resources.

2. The terminal device according to claim 1, wherein the first predetermined common preemption indicator transmission resources are within a first bandwidth part allocated to the terminal device and within a second bandwidth part allocated to a second terminal device, and the portion of the signals received within the allocated downlink resources comprising data signals transmitted to a different terminal device are commonly within the first bandwidth part and the second bandwidth part.

3. The terminal device according to claim 2, wherein the first bandwidth portion is divided into a plurality of predetermined resource sets one of which is the first predetermined resource set and each predetermined resource set is associated with separate common preemption indicator transmission resources.

4. The terminal device according to claim 1, wherein an end of the first predetermined common preemption indicator transmission resources allocated for the transmission of a preemption indicator associated with the first predetermined resource set occurs contemporaneously with or after an end of the first predetermined resource set.

5. The terminal device according to claim 1, wherein the control circuitry is configured to
determine that a second predetermined resource set includes at least a portion of the allocated downlink resources,
control the receiver circuitry to receive signals within a second predetermined set of downlink resources allocated for the transmission of a second preemption indicator associated with the second predetermined resource set, and
determine, based on the signals received within the second predetermined set of downlink resources, whether a portion of the signals received within the allocated downlink resources and within the second predetermined resource set comprises data signals transmitted to the different terminal device.

6. The terminal device according to claim 1, wherein the control circuitry is configured to control the receiver circuitry to receive signalling information from the network, the signalling information defining at least one of the first predetermined resource set and the first predetermined common preemption indicator transmission resources allocated for the transmission of the first preemption indicator associated with the first predetermined resource set.

7. The terminal device according to claim 1, wherein the control circuitry is configured to
control the receiver circuitry to receive via the wireless radio interface, signals within downlink resources allocated for the transmission of a supplementary preemption indicator, the supplementary preemption indicator associated with the allocated downlink resources for reception of data by the terminal device, and
determine, based on the signals received within the downlink resources allocated for the transmission of a supplementary preemption indicator, whether a portion of the signals received within the allocated downlink resources comprises data signals transmitted to a different terminal device.

8. The terminal device according to claim 1, wherein the control circuitry is configured to control the receiver circuitry to receive, via the wireless radio interface, signalling information indicating at least one of the first frequency the second frequency, the first resource set starting time and the first resource set ending time.

9. A method comprising:
determine an allocation of downlink resources of a wireless radio interface for reception of data by a terminal device;
control receiver circuitry to receive signals representing data within the allocated downlink resources;
determine that the allocated downlink resources include at least a portion of a first predetermined resource set, wherein the first predetermined resource set is characterized by a contiguous range of predetermined frequencies between a first frequency and a second frequency for a predetermined time period between a first resource set starting time and a first resource set ending time;
control the receiver circuitry to receive, via the wireless radio interface, signals within first predetermined common preemption indicator transmission resources allocated for a transmission of a first preemption indicator associated with the first predetermined resource set, wherein the first preemption indicator is configured through radio resource control (RRC), wherein the signals received within the first predetermined common preemption indicator transmission resources comprise a common preemption indicator and the common preemption indicator identifies a set of resources within the first predetermined resource set, the identified set of resources including at least a portion of the resources within the first predetermined resource set allocated for the downlink transmission of data to the terminal device in which data was transmitted to a different terminal device;
determine, based on the signals received within the first predetermined common preemption indicator transmission resources, whether a portion of the signals received within the allocated downlink resources and within the first predetermined resource set comprises data signals transmitted to a different terminal device, wherein the portion of the signals are determined based on a first parameter in a time domain and a second parameter in a frequency domain; and determine the first frequency, the second frequency, the first resource set starting time and the first resource set ending time based on the first predetermined common preemption indicator transmission resources,
wherein the first frequency is determined based on a predetermined frequency offset and the first resource set start time is determined based on a predetermined time offset after receiving the common preemption indicator within the first predetermined common preemption indicator transmission resources.

10. A non-transitory computer readable storage medium storing computer executable instructions that when executed by a computing device cause said computing device to effectuate operations comprising:
determining an allocation of downlink resources of a wireless radio interface for reception of data by a terminal device;
controlling receiver circuitry to receive signals representing data within the allocated downlink resources;
determining that the allocated downlink resources include at least a portion of a first predetermined resource set, wherein the first predetermined resource set is characterized by a contiguous range of predetermined frequencies between a first frequency and a second frequency for a predetermined time period between a first resource set starting time and a first resource set ending time;
controlling the receiver circuitry to receive, via the wireless radio interface, signals within first predetermined common preemption indicator transmission resources allocated for a transmission of a first preemption indicator associated with the first predetermined resource set, wherein the first preemption indicator is configured through radio resource control (RRC), wherein the signals received within the first predetermined common preemption indicator transmission resources comprise a common preemption indicator and the common preemption indicator identifies a set of resources within the first predetermined resource set, the identified set of resources including at least a portion of the resources within the first predetermined resource set allocated for the downlink transmission of data to the terminal device in which data was transmitted to a different terminal device;
determining, based on the signals received within the first predetermined common preemption indicator transmission resources, whether a portion of the signals received within the allocated downlink resources and within the first predetermined resource set comprises data signals transmitted to a different terminal device, wherein the portion of the signals are determined based on a first parameter in a time domain and a second parameter in a frequency domain; and
determining the first frequency, the second frequency, the first resource set starting time and the first resource set ending time based on the first predetermined common preemption indicator transmission resources,
wherein the first frequency is determined based on a predetermined frequency offset and the first resource set start time is determined based on a predetermined time offset after receiving the common preemption indicator within the first predetermined common preemption indicator transmission resources.

* * * * *